United States Patent [19]

Yoshinaga et al.

[11] Patent Number: 5,384,069
[45] Date of Patent: Jan. 24, 1995

[54] POLYMERIC LIQUID CRYSTAL COMPOSITION AND LIQUID CRYSTAL DEVICE

[75] Inventors: Kazuo Yoshinaga, Machida; Yutaka Kurabayashi, Yokohama; Toshikazu Ohnishi, Atsugi; Yukiko Futami, Sagamihara; Takeshi Miyazaki, Ebina, all of Japan

[73] Assignee: Canon Kabushiki Kaisha, Tokyo, Japan

[21] Appl. No.: 938,596

[22] Filed: Sep. 3, 1992

Related U.S. Application Data

[63] Continuation of Ser. No. 613,452, Nov. 14, 1990, abandoned, which is a continuation of Ser. No. 195,084, May 17, 1988, abandoned.

[30] Foreign Application Priority Data

| May 18, 1987 | [JP] | Japan | 62-119047 |
| May 21, 1987 | [JP] | Japan | 62-122470 |
| May 21, 1987 | [JP] | Japan | 62-122471 |
| May 30, 1987 | [JP] | Japan | 62-137856 |
| May 30, 1987 | [JP] | Japan | 62-137857 |

[51] Int. Cl.⁶ .......................... C09K 19/00; G02F 1/13
[52] U.S. Cl. .................... 252/299.01; 359/104; 428/1
[58] Field of Search .............. 252/299.01; 359/104; 428/1

[56] References Cited

U.S. PATENT DOCUMENTS

| 4,088,393 | 5/1978 | Hirano | 350/350 |
| 4,293,435 | 10/1981 | Portugall et al. | 252/299.01 |
| 4,363,743 | 12/1982 | Moeller et al. | 252/299.1 |
| 4,367,924 | 1/1983 | Clark et al. | 350/344 |
| 4,556,727 | 12/1985 | Walba | 560/73 |
| 4,561,726 | 12/1985 | Goodby et al. | 350/341 |
| 4,581,399 | 4/1986 | Yoon | 524/246 |
| 4,615,586 | 10/1986 | Geary et al. | 350/350 S |
| 4,631,328 | 12/1986 | Ringsdorf et al. | 526/259 |
| 4,637,896 | 1/1987 | Shannon | 252/299.7 |
| 4,801,756 | 1/1989 | Kano | 568/642 |
| 4,892,675 | 1/1990 | Nohira et al. | 252/299.01 |
| 4,904,066 | 2/1990 | Gray et al. | 350/350 |

FOREIGN PATENT DOCUMENTS

| 228703A | 7/1987 | European Pat. Off. | |
| 3324770 | 1/1984 | Germany | |
| 6090290 | 5/1985 | Japan | 252/299.01 |

OTHER PUBLICATIONS

"Chiral thermotropic L C polymers" Chiellini and Galli in Recent Advances in L C polymers edited by Chapoy.
Ciferri, A. in Polymer Liquid Crystals, Academic, 1982, p. 73.
Chiellini, E et al Polym. Bull. 9 336, 1983.
Walba et al J. Am. Chem. Soc. 108, 5210, 1986.

(List continued on next page.)

*Primary Examiner*—Sheam Wu
*Attorney, Agent, or Firm*—Fitzpatrick, Cella, Harper & Scinto

[57] ABSTRACT

A polymeric liquid crystal composition includes a polymer mesomorphic compound having an asymmetric carbon atom and a low-molecular weight mesomorphic compound. The composition can be easily formed into a film of a large area, exhibits a response speed which is not substantially different from that of the low-molecular weight mesomorphic compound alone and stably retains alignment resistant to pressure or heat impact. Such a good alignment is especially obtained when the polymeric liquid crystal composition is incorporated in a liquid crystal device by being disposed between a pair of substrates preferably having an alignment face provided with an orientation characteristic for aligning the molecular axis of the liquid crystal composition in one direction. It is suitable that the polymer mesomorphic compound is optically active and has a helical rotation direction opposite to that of the low-molecular weight mesomorphic compound.

15 Claims, 4 Drawing Sheets

OTHER PUBLICATIONS

Hopwood, A. I.; Coles, H. J. Polymer 26, 1312, 1985.
Sigaud, G. et al. Mol. Cryst. Liq. Cryst. 155, 443, 1988.
"Volt.-Depend. Optical Act. of A Twisted Nematic Liq. Cryst.", Schadt and Helfrich, Applied Physics Letters, vol. 18, No. 4, Feb. 1971 (pp. 127-128).
"Submicrosec. Bistable Electro-Optic Switching in Liq.Cry.", Applied Phys. Letters, vol. 36, pp. 899-901 (1980), N. Clark and S. Langerwall.
"Behav; of Liquid. Crystal. Side Chain Polymers in an Electric Field" Mol. Crystal. Liq. Crystal+Ltrs., vol. 94, Nos. 3/4, 1983, pp. 343-358.
Patent Abstracts of Japan, vol. 9, No. 233 (C-304)[1956], Sep.19, 1985.
Patent Abstracts of Japan, vol. 11, No. 75 (C-408) [2522], Mar. 26, 1987.
Patent Abstracts of Japan, vol. 10, No. 383 (C-393) [2440], Dec. 23, 1986.
"Surface Anchor. of Liquid Crystal Molecules on Various Substrates", Mol. Cryst. and Liquid Cryst.+Letters, vol. 94, Nos. 1/2 pp. 33-41.

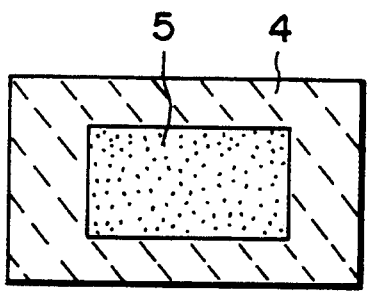
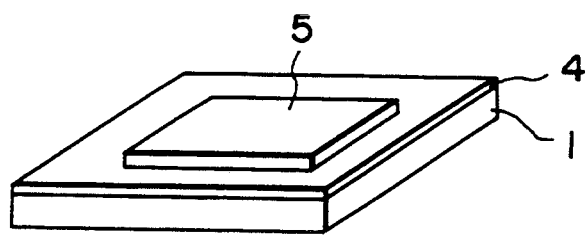
FIG. 2C    FIG. 2D
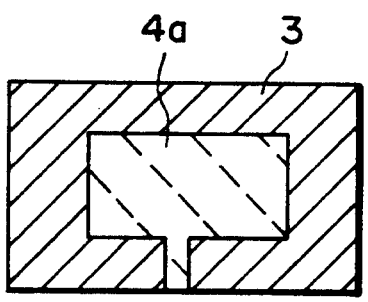
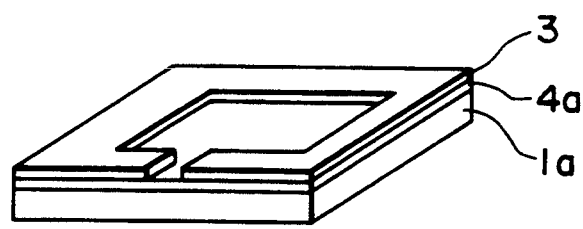
FIG. 2E    FIG. 2F

POLYMERIC LIQUID CRYSTAL COMPOSITION AND LIQUID CRYSTAL DEVICE

This is application is a continuation of application Ser. No. 613,452 filed Nov. 14, 1990, now abandoned, which is a continuation of application Ser. No. 195,084, filed May 17, 1988, now abandoned.

FIELD OF THE INVENTION AND RELATED ART

The present invention relates to a polymeric liquid crystal composition and a liquid crystal device adapted for fine and high speed display of a large area, particularly a polymeric liquid crystal composition excellent in alignment stability and adapted to a ferroelectric polymeric liquid crystal of a high response speed and a liquid crystal device using the polymeric liquid crystal composition.

A well known type of liquid crystal devices using TN (twisted nematic) type liquid crystals is shown, for example, in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. In this type of liquid crystal device, the number of picture elements have been restricted, because a crosstalk phenomenon occurs when a device of a matrix electrode structure with a high density of picture elements is driven according to a multiplexing driving scheme. Further, their uses for display have been limited because of slow electric field response and poor visual angle characteristics.

Another type of liquid crystal device, comprises a plurality of picture elements each connected to and subject to switching by a thin film transistor as a switching element. In this type of liquid crystal device, however, the production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device showing bistability (e.g., U.S. Pat. No. 4,367,924). As the bistable liquid crystal, a ferroelectric crystal showing a chiral smectic C phase (SmC*) or H phase (SmH*) is generally used.

Such a ferroelectric liquid crystal has a very rapid response speed on account of having spontaneous polarization, and can also exhibit a memorizable bistable state. It also has excellent vision angle characteristics, and therefore it is considered to be suitable for a display of large capacity having a large picture area. In actual production of a liquid crystal cell, however, it is difficult to develop a monodomain over a wide area, thus providing a technical problem in producing a display device of a large area.

In order to solve such a problem, it has been reported to form a monodomain of a ferroelectric smectic liquid crystal by means of an epitaxial technique utilizing an interfacial energy (U.S. Pat. No. 4,561,726). The thus obtained monodomain however is not essentially stable but can be reformed into multi-domains, so that it is difficult to form such a monodomain over a wide area.

Further, as has been proposed by Clark et al, it is necessary to provide a small cell gap d which is not larger than the helical pitch p of the liquid crystal ($d \leq p$) to unwind the helix (N. A. Clark, S. T. Lagerwall, "Appl. Phys. Lett." 36,899-(1980)). Most ferroelectric liquid crystals known at present, however, generally have a small helical pitch and it is necessary to provide a small cell gap of 1–2 $\mu$m. However, it is difficult to form such a thin cell in a large area.

As a method of solving the above problem, it has been proposed to mix a liquid crystal having a clockwise rotational helix and a liquid crystal having an anti-clockwise rotational helix (JP-A (Tokkai) 60-90290). According to this method, it is possible to provide an increased helical pitch without excessively decreasing the spontaneous polarization of a ferro-electric liquid crystal. In order to produce a liquid crystal device of a large area, it is necessary to form a uniform monodomain in addition to the increase in helical pitch as described above. For this purpose, an appropriate aligning treatment has been applied to a liquid crystal cell. In this instance, the presence of spacers used for preparing a liquid crystal device can cause alignment defects.

In view of the above difficulties accompanying the use of low-molecular weight liquid crystals, it may be conceived of using a polymeric liquid crystal which has excellent alignment stability with resistance to pressure and thermal stimulation because of polymeric visco-elasticity and also a good film-forming characteristic.

As examples of liquid crystal displays using such polymeric liquid crystals, a thermal writing-type polymeric liquid crystal display device as disclosed by V. Shibaev, S. Kostromin, N. Pláate, S. Ivanov and I. Yakovlev; "Polymer Communications, Vol. 24, pp. 364–365, "Thermotropic Liquid Crystalline Polymers, 14" and a device using an electrical field response, have been proposed.

According to such a display system using a polymeric liquid crystal, it has been impossible to effect a highly fine and high-speed display as required in a motion picture display because of the low response speed of a polymeric liquid crystal relative to a low-molecular weight liquid crystal. Further, a liquid crystal aligning or orientation characteristic has been provided to a substrate surface for example by rubbing or oblique vapor deposition so as to form a liquid crystal monodomain in the case of a low-molecular weight liquid crystal. Such an aligning or orientation technique generally fails to provide a good alignment of a polymeric liquid crystal because of the high melt-viscosity of the polymeric liquid crystal.

As described above, no method of effectively using a polymeric liquid crystal and no method of alignment for such a device are known. As a result, no device capable of highly sensitive and high-speed switching has been provided and even an alignment for providing a good display characteristic has not been effected.

SUMMARY OF THE INVENTION

An object of the present invention is to solve the above-mentioned problems of the prior art, to thereby to provide a polymeric liquid crystal composition which satisfies a high-speed responsive characteristic capable of providing a motion picture display of a large area and a high degree of fineness and also has an excellent alignment stability resisting pressure and heat stimulation.

Another object of the present invention is to provide a liquid crystal device with a uniform alignment over a wide area.

A further object of the present invention is to provide a liquid crystal device using a polymeric liquid crystal exhibiting a high-speed responsive characteristic and a high contrast comparable to those of a liquid crystal device using a low-molecular weight liquid crystal.

According to the present invention, there is provided a polymeric liquid crystal composition comprising a polymer mesomorphic compound having an asymmetric carbon atom and a low-molecular weight mesomorphic compound.

According to another aspect of the present invention, there is provided a liquid crystal device comprising: a pair of substrates, and a polymeric liquid crystal composition disposed between the substrates; the polymeric liquid crystal composition comprising a polymer mesomorphic compound having an asymmetric carbon atom and a low-molecular weight mesomorphic compound. It is preferred that at least one of the pair of substrates has an alignment face provided with an orientation characteristic for aligning the molecular axis of the polymeric liquid crystal composition in contact with the alignment face in one direction.

The present invention further provides a liquid crystal device wherein the polymeric liquid crystal composition has a cholesteric-smectic A phase transition temperature and is used in the form of a film, and also a liquid crystal device wherein such a polymeric liquid crystal composition has been subjected to alignment through a cholesteric-smectic A phase transition.

The present invention further provides a polymeric liquid crystal composition wherein at least one species of the low-molecular weight mesomorphic compound and the polymer mesomorphic compound have mutually reverse helical rotation directions, and also a liquid crystal device containing such a polymeric liquid crystal composition.

Herein, the term "mesomorphic compound" refers to a compound which exhibits a liquid crystal phase by itself or in a compatible mixture with another mesomorphic compound.

These and other objects, features and advantages of the present invention will become more apparent upon a consideration of the following description of the preferred embodiments of the present invention taken in conjunction with the accompanying drawings wherein like parts are denoted by like reference numerals.

BRIEF DESCRIPTION OF THE DRAWINGS

FIGS. 2C–2F are schematic illustrations of a process for preparing laminar structures of a pair of substrates and for bonding the substrates in Examples 3 and 4 of the invention;

DETAILED DESCRIPTION OF THE PREFERRED EMBODIMENTS

Figure 1:
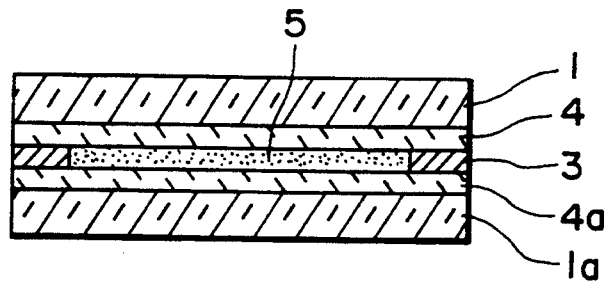
FIG. 1 is a schematic sectional view showing an embodiment of the liquid crystal device of the present invention.

The low-molecular weight mesomorphic compound used in the liquid crystal composition of the present invention may suitably be one exhibiting a nematic phase or smectic phase, preferably one showing chiral smectic phase. The term "low-molecular weight (or non-polymeric) mesomorphic compound" used herein is used in contrast with the term polymer mesomorphic compound and refers to a mesomorphic compound which is substantially free of repetition of a mesogen unit and has two recurring mesogen units at the maximum, if any. Specific examples of the low-molecular weight or non-polymeric mesomorphic compound include those of the formulas (1)–(15) shown below together with their phase transition characteristics wherein Cryst. denotes the crystal phase; SmC*, the chiral smectic C phase, SmH*, the chiral smectic H phase; SmA, the smectic A phase; Sm3, the un-identified smectic phase; Ch., the cholesteric phase; and Iso., the isotropic phase.

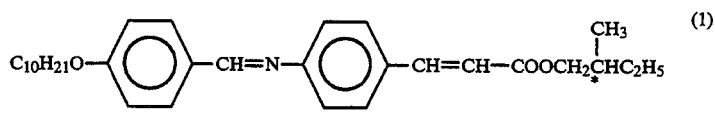

(1)

p-decyloxybenzylidene-p'-amino-2-methylbutylcinnamate (DOBAMBC)

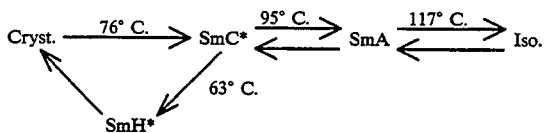

(2)

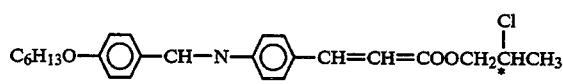

p-hexyloxybenzylidene-p'-amino-2-chloropropylcinnamate (HOBACPC)

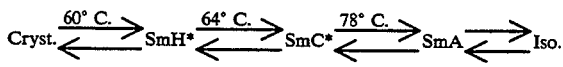

(3)

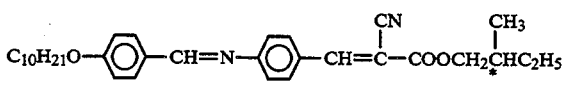

p-decyloxybenzylidene-p'-amino-2-methylbutyl-α-cyanocinnamate (DOBAMBCC)

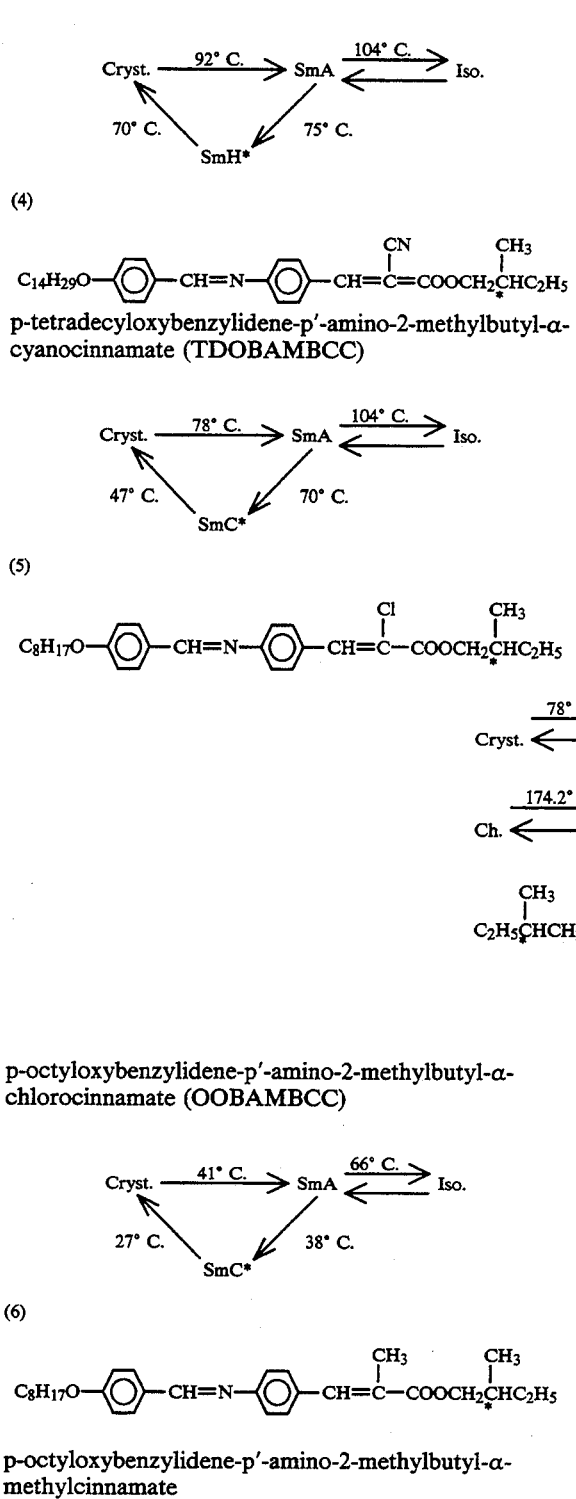
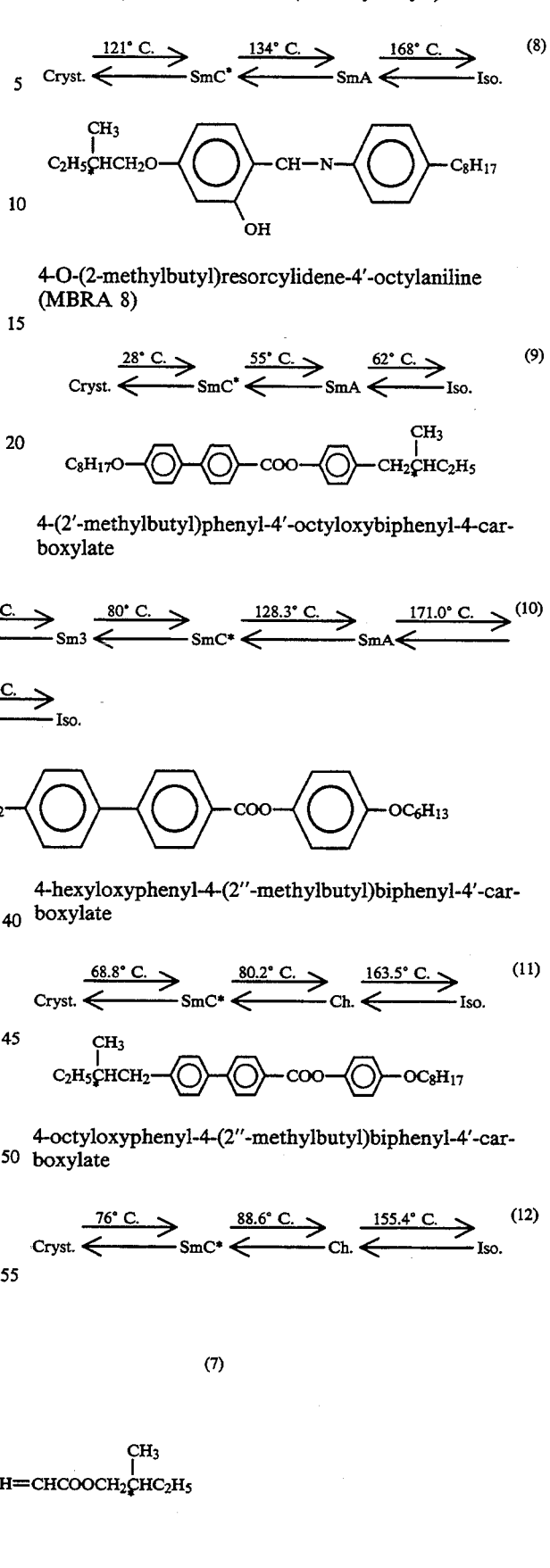

-continued

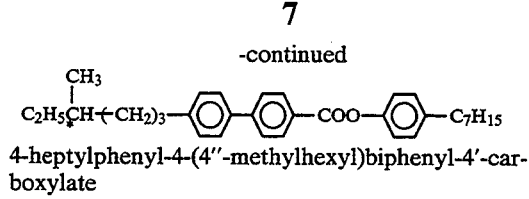

4-heptylphenyl-4-(4''-methylhexyl)biphenyl-4'-carboxylate

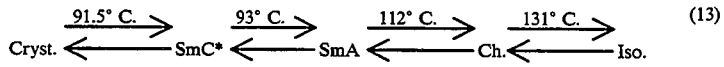

(13)

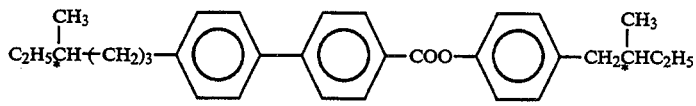

4-(2''-methylbutyl)phenyl-4-(4'''-methylhexyl)biphenyl-4'-carboxylate

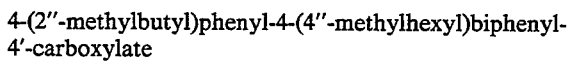

(14)

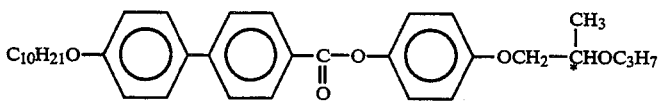

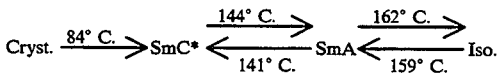

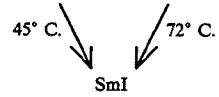

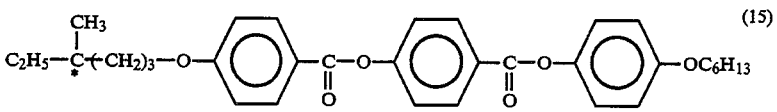

(15)

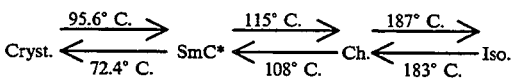

The polymer mesomorphic compound having an asymmetric carbon atom may be one of a branch-type having a branch including a mesogen unit or one of a main chain-type having a main chain unit including a mesogen unit.

Examples of the branch-type polymer mesomorphic compound include those represented by the following formulas (16)–(27) wherein * denotes an asymmetric carbon center and n1 is a number of recurring units ranging from 5 to 1000, preferably 10 to 1000. Thus, the term "polymer" used herein refers to a mesomorphic compound having a number of recurring units of 5 or more, preferably 10 or more.

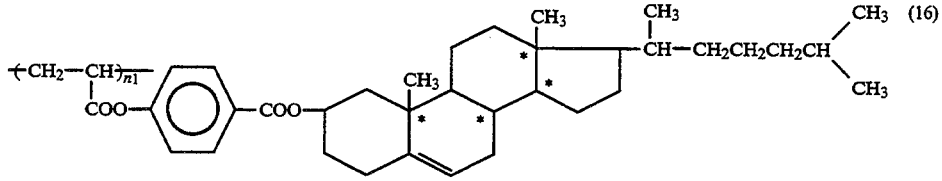

(16)

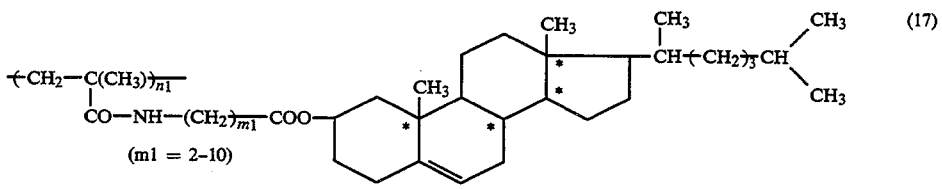

(17)

(m1 = 2-10)

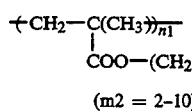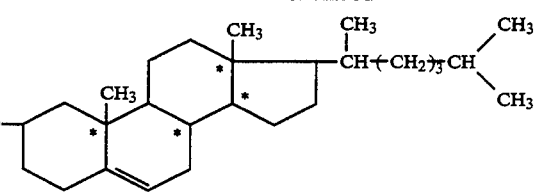 (18)
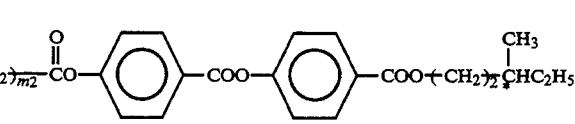 (19)
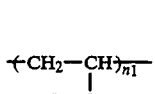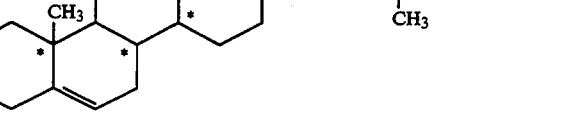 (20)
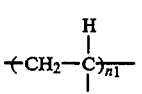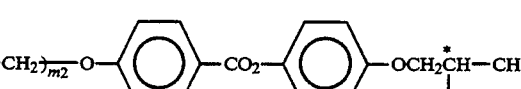 (21)
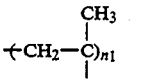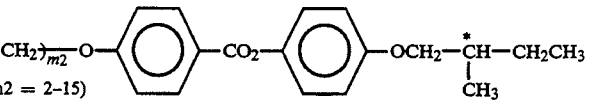 (22)
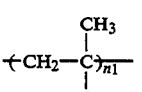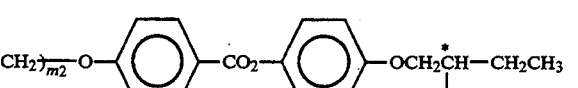 (23)
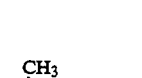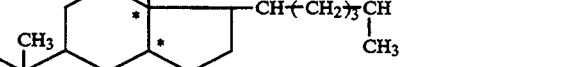 (24)
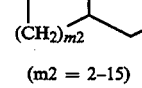 (25)

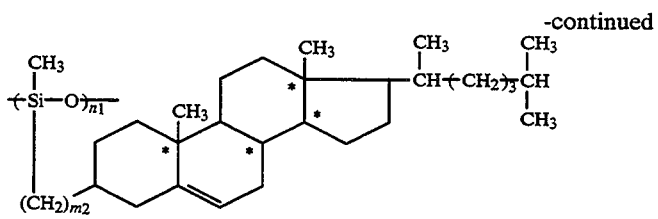

(25)

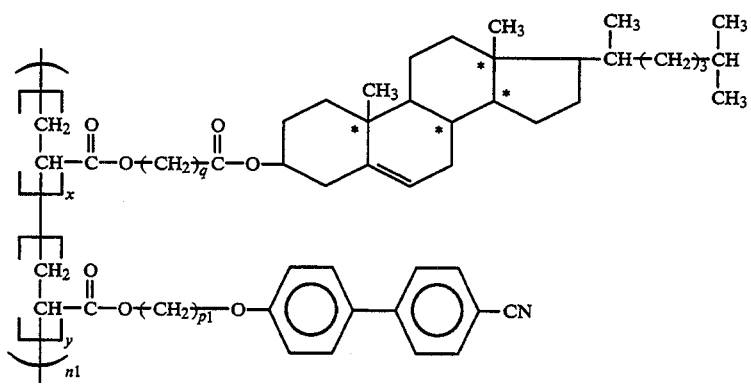

(26)

(x + y = 1, q = 1–10, p1 = 1–10)

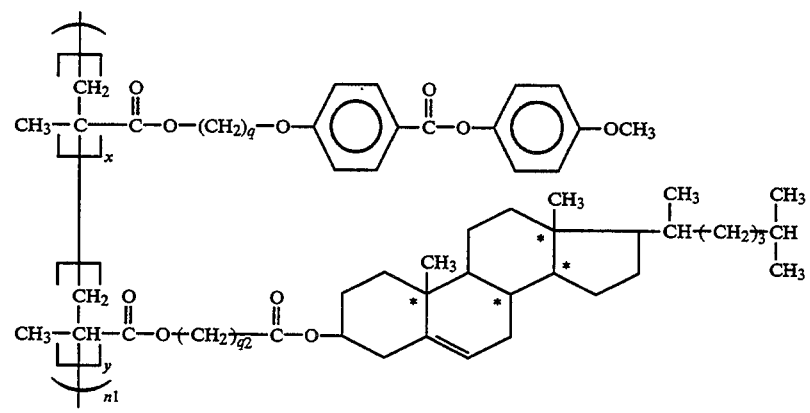

(27)

(x + y = 1, q = 1–10, p2 = 1–15)

The main chain-type polymer mesomorphic compound is a mesomorphic compound comprising a mesogen (mesomorphicity-imparting skeleton), a flexible chain and an optically active group and assuming a polymer form preferably through an ester linkage.

Specific examples of the mesogen may include: dicarboxylic acids, such as terphenyl-dicarboxylic acid, p-terephthalic acid, naphthalene-dicarboxylic acid, biphenyldicarboxylic acid, stilbene-dicarboxylic acid, azobenzene-dicarboxylic acid, azoxybenzene-dicarboxylic acid, cyclohexanedicarboxylic acid, biphenyl etherdicarboxylic acid, biphenoxyethane-dicarboxylic acid, biphenylethane-dicarboxylic acid, and carboxycinnamic acid; diols, such as hydroquinone, dihydroxybiphenyl, dihydroxyterphenyl, dihydroxyazobenzene, dihydroxyazoxybenzene, dihydroxydimethylazobenzene, dihydroxydimethylazoxybenzene, dihydroxypyridazine, dihydroxynaphthalene, dihydroxyphenyl ether, and bis (hydroxyphenoxy)ethane; and hydroxycarboxylic acids, such as hydroxybenzoic acid, hydroxybiphenylcarboxylic acid, hydroxyterphenylcarboxylic acid, hydroxycinnamic acid, hydroxyazobenzenecarboxylic acid, hydroxyazoxybenzenecarboxylic acid, and hydroxystilbenecarboxylic acid.

Examples of the flexible chain source may include: diols, such as methylene glycol, ethylene glycol, propanediol, butanediol, pentanediol, hexanediol, heptanediol, octanediol, nonanediol, decanediol, undecanediol, dodecanediol, tridecanediol, tetradecanediol, pentadecanediol, diethylene glycol, triethylene glycol, tetraethylene glycol, nonaethylene glycol, and tridecaethylene glycol; and dicarboxylic acids, such as malonic acid, succinic acid, glutaric acid, adipic acid, pimelic acid, suberic acid, azelaic acid, and sebacic acid.

The optically active group may preferably be di-functional. Specific examples of the optically active group may include those derived from the following source compounds:

(+)-3-methyl-1,6-hexanediol (−)-3-methyl-1-6-hexanediol, (+)-3-methyladipic acid, (−)-3-methyl adipic acid, (D)-mannitol, (U)-mannitol, (+)-pantothenic acid, (+)-1,2,4-trihydroxy-3,3-dimethylbutane, (−)-1,2-propanediol, (+)-1,2-propanediol, (+)-lactic acid, (−)-lactic acid, (2S, 5S)-2-methyl-3-oxahexane-1,5-diol, (2S, 5S, 8S)-2,5-dimethyl-3,6-dioxanonane-1,8-diol.

By subjecting a mesogen, a flexible chain source and an optically active source compound as mentioned above, a polymer mesomorphic compound having an asymmetric carbon atom of the present invention can be obtained. At this time, it is possible to increase the degree of polymerization and decrease impurities due to by-reactions by using a catalyst. It is however desirable to remove such impurities by re-precipitation, etc.

Specific examples of the main chain-type polymer mesomorphic compound include those represented by the following formulas (28)–(40) wherein the number of recurring units n2 may preferably be 5 to 1000, particularly 10 to 1000.

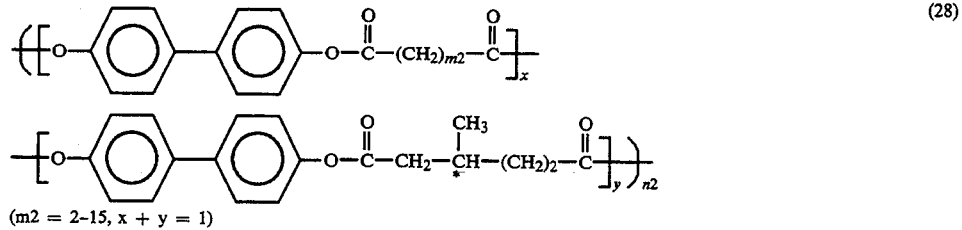

(28)

(m2 = 2–15, x + y = 1)

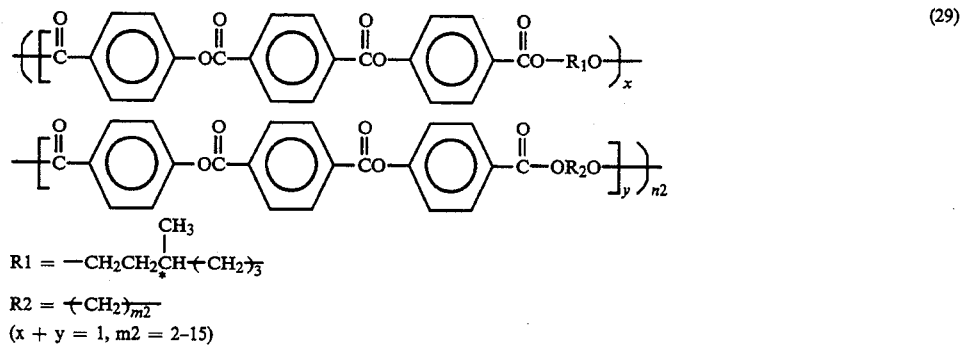

(29)

$R_1 = -CH_2CH_2\overset{*}{C}H(CH_2)_3$
   $\quad\quad\quad\ \ |$
   $\quad\quad\quad\ CH_3$ $R_2 = -(CH_2)_{\overline{m2}}-$ (x + y = 1, m2 = 2–15)

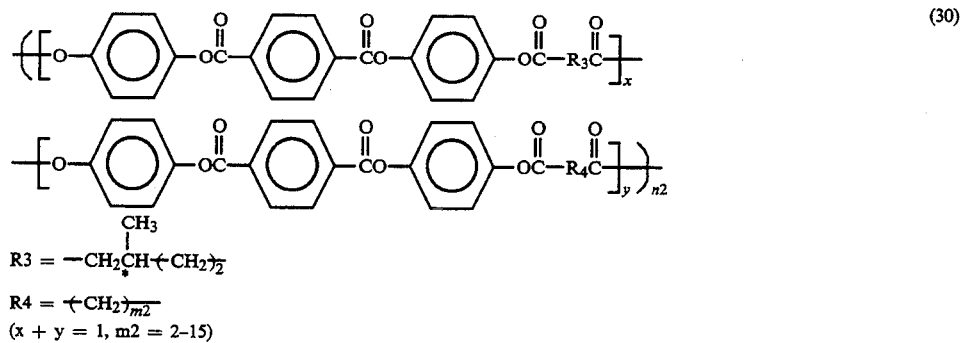

(30)

$R_3 = -CH_2\overset{*}{C}H(CH_2)_2$
   $\quad\quad\ |$
   $\quad\quad CH_3$ $R_4 = -(CH_2)_{\overline{m2}}-$ (x + y = 1, m2 = 2–15)

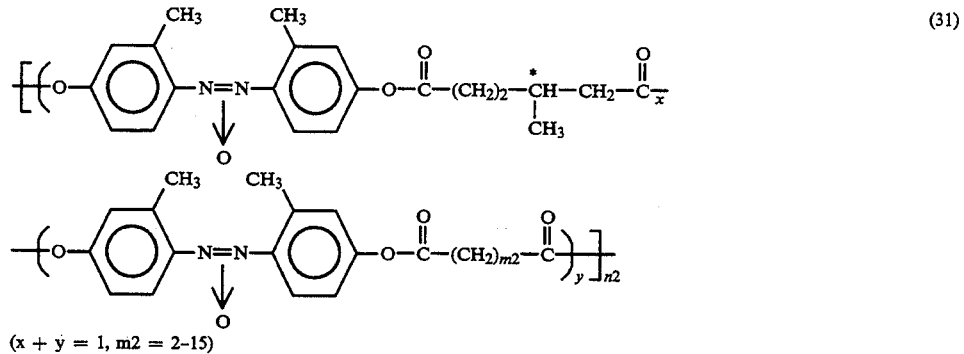

(31)

(x + y = 1, m2 = 2–15)

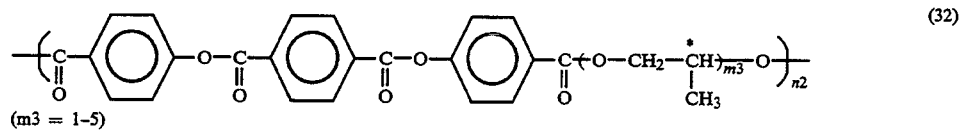

(32)

(m3 = 1–5)

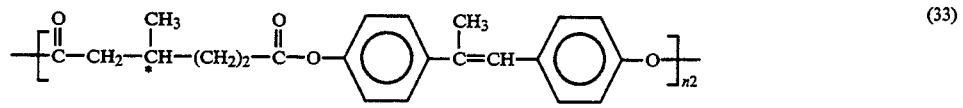

(33)

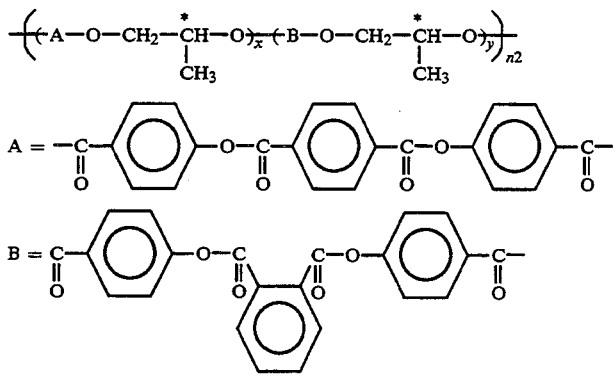
(34)
(x + y = 1)
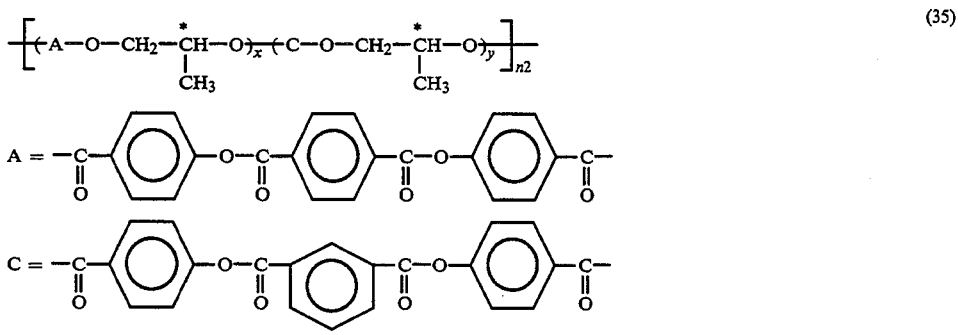
(35)
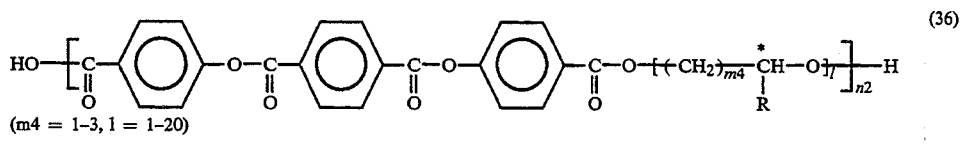
(36)
(m4 = 1-3, l = 1-20)
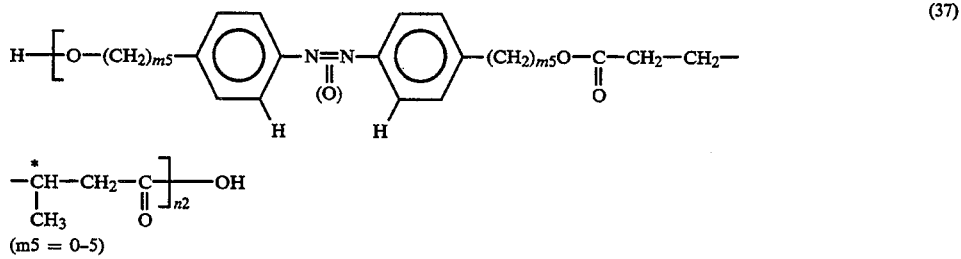
(37)
(m5 = 0-5)
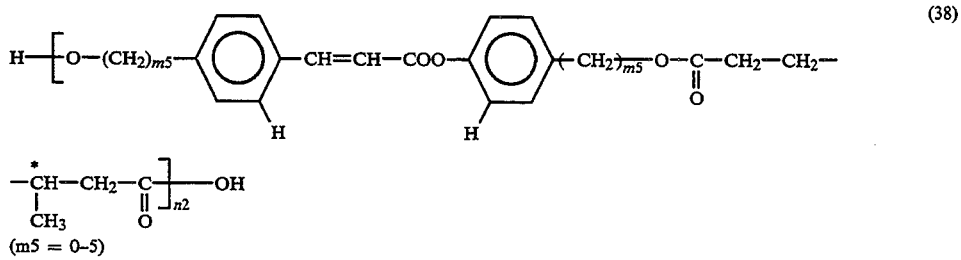
(38)
(m5 = 0-5)
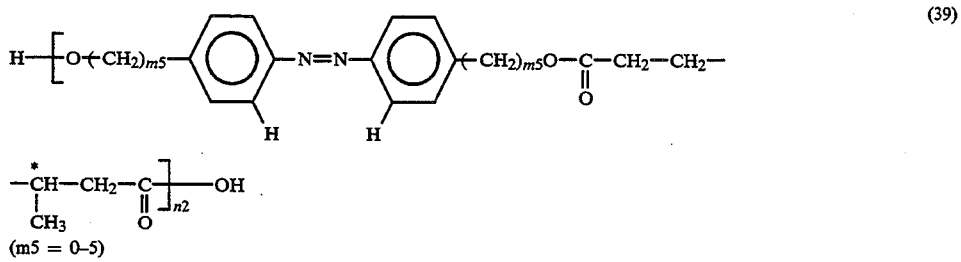
(39)
(m5 = 0-5)

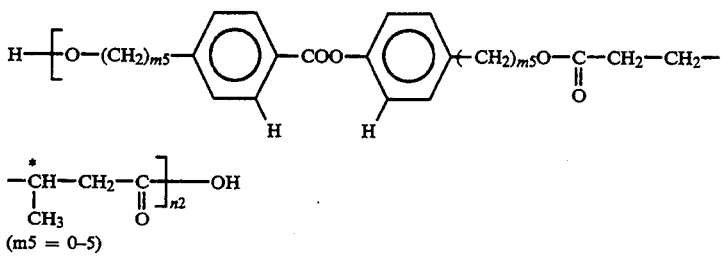

(40)

$-\overset{*}{C}H-CH_2-\underset{\underset{O}{\|}}{C}\overset{\phantom{|}}{\Big]}_{n2}-OH$
| 
$CH_3$ (m5 = 0-5)

The polymeric liquid crystal composition according to the present invention may be obtained by mixing the above-mentioned polymer mesomorphic compound having an asymmetric carbon atom and the low-molecular weight mesomorphic compound in specific proportions through melting under heating or dissolution in a common solvent.

The polymer mesomorphic compound may preferably be contained in a proportion of 10–90 wt. %, particularly 20–85 wt. %. Below 10 wt. %, the alignment stability in response to pressure or heat stimulation attributable to the polymer mesomorphic compound cannot be sufficiently exhibited. On the other hand, above 90 wt. %, a liquid crystal layer with an ununiform thickness is liable to result because of an excessively high viscosity during injection into a cell or film formation, and further a long period of time is required for the liquid crystal layer formation as by injection so that the composition is liable to deteriorate and fail to exhibit sufficient desirable characteristics.

On the other hand, the low-molecular weight mesomorphic compound may preferably be contained in the polymeric liquid crystal composition in a proportion of 90 to 10 wt. %, particularly 80 to 15 wt. %.

In preparing the liquid crystal composition according to the present invention, it is desirable to use the polymer mesomorphic compound having an asymmetric carbon atom and the low-molecular weight mesomorphic compound respectively in plural species in view of required characteristics in designing of a device, so as to control the temperature characteristic, optical characteristic, electrical characteristic, etc.

The liquid crystal device according to the present invention may be obtained by disposing a polymeric liquid crystal composition obtained in the above-described manner between a pair of substrates, at least one of which preferably has an alignment surface having the function of aligning liquid crystal molecules in the liquid crystal composition in a prescribed direction.

The substrate to be used in the present invention may comprise an arbitrary material, such as glass, plastic or metal. In order to provide a recording medium or display device, a transparent electrode such as an ITO film or patterned electrode may be formed as desired on the substrate.

Such a substrate may preferably be provided with the function of orienting or aligning the polymer mesomorphic composition through application of the following methods.

(1) For providing homogeneous alignment wherein the molecular axis of the polymer mesomorphic compound is aligned in a direction parallel to the substrate, the following methods may be used:

(i) Rubbing

A substrate is coated with an alignment control film of an inorganic insulating material, such as silicon monoxide, silicon dioxide, aluminum oxide, zirconia, magnesium fluoride, cerium oxide, cerium fluoride, silicon nitride, silicon carbide or boron nitride; or an organic insulating material, such as polyvinyl alcohol, polyimide, polyamide-imide, polyester-imide, polyparaxylylene, polyester polycarbonate, polyvinyl acetal, polyvinyl chloride, polyamide, polystyrene, cellulose resin, melamine resin, urea resin or acrylic resin. The alignment control after film formation of such an inorganic insulating material or organic insulating material is subjected to surface rubbing with velvet, cloth or paper.

(ii) Oblique vapor deposition vapor deposition of an oxide such as SiO, a fluoride, a metal such as Au or Al or its oxide is effected from an angle oblique to a substrate surface.

(iii) Oblique etching

An organic or inorganic insulating film obtained as shown in (i) is etched by irradiation with an iron beam or oxygene plasma stream obliquely.

(iv) Application of a stretched polymer film

A stretched film of a polymer such as polyester or polyvinyl alcohol is applied to a substrate.

(v) Grating

Minute grooves are formed on a substrate surface by photolithography, stamping or injection.

(2) For providing homeotropic alignment wherein the molecular axis of the polymer mesomorphic compound is aligned in a direction perpendicular to the substrate face, the following methods may be used:

(i) Homeotropic alignment film

A substrate surface is coated with a homeotropic alignment film of an organic silane, lecithin, polytetrafluoroethylene, etc.

(ii) Oblique vapor deposition

Oblique vapor deposition as explained in (i)–(ii) is performed at an appropriately selected vapor deposition angle while rotating the substrate to provide a homeotropically aligning characteristic. Further, after the vapor deposition, it is possible to apply a homeotropic aligning agent as described above in (i).

An embodiment of the liquid crystal device according to the present invention is explained with reference to FIG. 1. Referring to FIG. 1, the device comprises a pair of substrates 1 and 1a having thereon alignment control films (hereinafter, simply called "alignment film(s)") 4 and 4a, respectively; and a layer of polymeric liquid crystal composition (hereinafter, simply called "liquid crystal layer") 5 hermetically sealed with an adhesive or sealant 3 used in combination with a spacer (not shown) optionally used.

The substrates 1 and 1a are coated with alignment films 4 and 4a, respectively, through vapor deposition, spin coating, etc., followed by surface rubbing to provide a uniaxial orientation or alignment characteristic. One of the substrates thus treated is coated with a polymeric liquid crystal composition according to the present invention by spin coating and then the other substrate is applied thereto, followed by sealing of the periphery with the adhesive 3 to obtain a liquid crystal device. The liquid crystal device may be further heated, as desired, to a temperature sufficient to provide the isotropic phase of the polymeric liquid crystal composition, followed by gradual cooling to uniformly align the polymeric liquid crystal composition.

The thus obtained liquid crystal device can be used as an optical recording medium or display apparatus by changing the optical or electro-optical property of the polymeric liquid crystal composition. In such a case, consideration should be paid to the transparency of the substrate and electrodes formed thereon and to the light-absorbing characteristic of the polymeric liquid crystal composition. For this purpose, a light-absorbing colorant, for example, can be incorporated in the polymeric liquid crystal composition.

Further, it is possible to improve the durability and storage stability of the liquid crystal device by incorporating an antioxidant in the polymeric liquid crystal composition.

Examples of the antioxidant used for this purpose may include the following, while not being restricted thereto.

(1) Radical (chain-reaction) inhibitors
 (Inhibitors against alkyl peroxy radicals ROO-)
 1) Phenol-type antioxidants
 2) Amine-type antioxidants
(2) Decomposers for peroxides
 (Decomposition of hydroperoxides ROOH)
 1) Sulfur-type antioxidants
 2) Phosphor-type antioxidants Specific examples of the above-classified antioxidants may include the following:

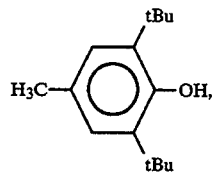

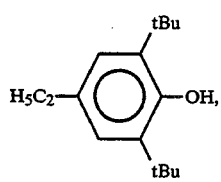

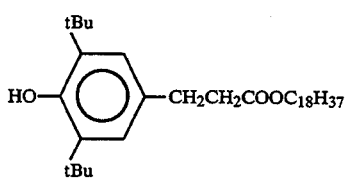

(Bisphenol type)

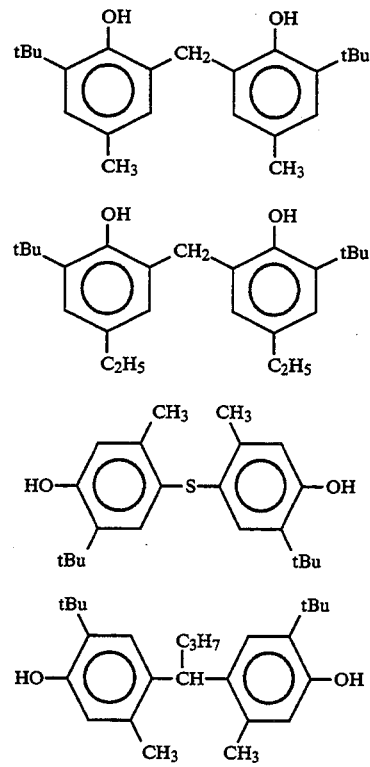

(Poly-phenol type)

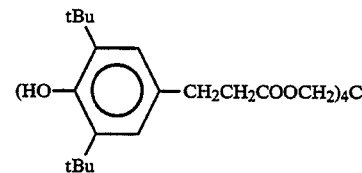

bis[3,3'-bis-(4'-hydroxy-3'-t-butylphenyl)-butyric acid] glycol ester
(Amine type)

For example, hindered amines showing an oxidation-inhibiting effect principally due to capture of radicals. Specific examples of the hindered amines include the following:

Products available from Ciba-Geigy A.G. (also Sankyo K.K.)
 Tinuvin 770 (Sanol LS-770)

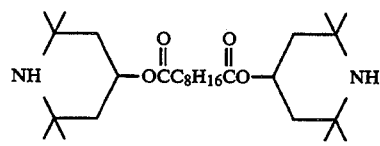

Tinuvin 744 (Sanol LS-744)

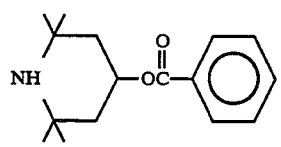

Tinuvin 622

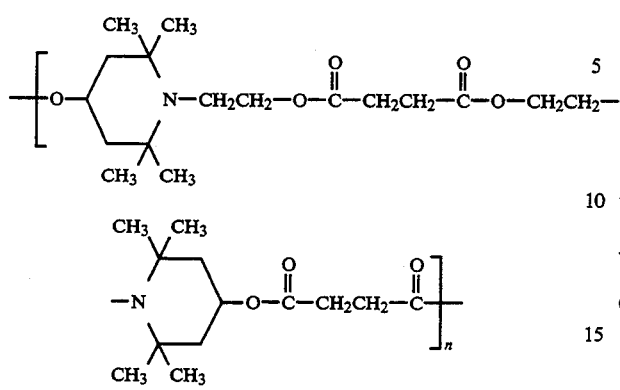

Tinuvin 144

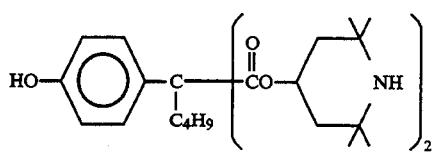

Available from Chimosa Chimica Organica S.p.A.
Chimassorb 944

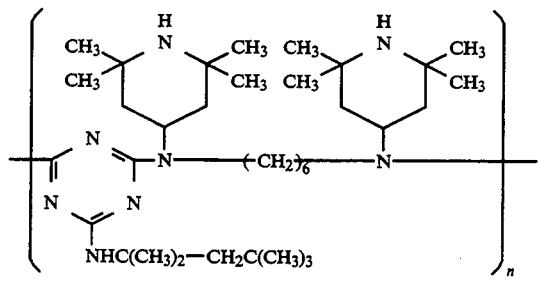

Available from Adeka Argus K.K.
Mark LA-57

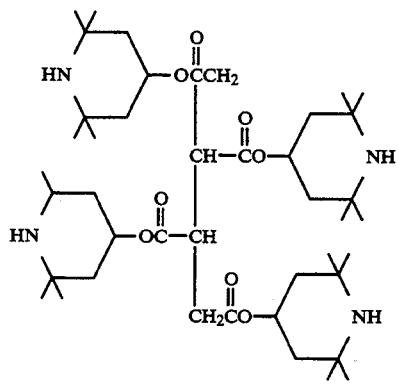

Available from American Cyanamide Co.
Cyasorb 3346,
Cyasorb 3457.
Available from B. F. Goodrich
Goodrite UV-3034

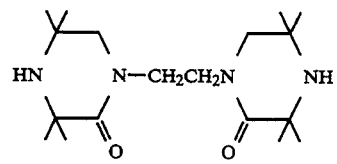

Available from Montedison S.p.A.
Montefluous A-36
Available from Hoechst A.G.
Hostavin TM-20
(Sulfur type)
$S(CH_2CH_2COOC_{12}H_{25})_2$
$S(CH_2CH_2COOC_{14}H_{29})_2$
$S(CH_2CH_2COOC_{18}H_{37})_2$
(Phosphor type)

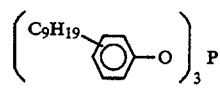

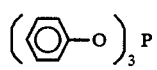

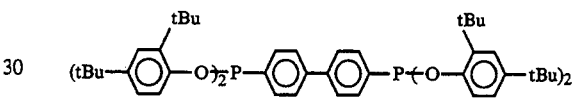

Further, it is also possible to incroporate an ultraviolet (U.V.) absorber in the polymeric liquid crystal composition of the invention so as to improve the lightfastness, storage stability and durability of the liquid crystal device. The U.V. absorber used in this invention is not particularly limited but may be selected from a wide scope of U.V. absorbers used generally in the field. The U.V. absorbers may for example be of the salicylate type, benzophenone type, benzotriazole type, cyanoacrylate type, etc. Specific examples of the U.V. absorbers may include the following.

(Salicylate type)
phenyl salicylate, p-tert-butylphenyl salicylate, p-octylphenyl salicylate.

(Benzophenone type)
2,4-dihydroxybenzophenone, 2-hydroxy-4-methoxybenzophenone, 2-hydroxy-4-octyloxybenzophenone.

(Benzotriazole type)
2-(2'-hydroxy-5'-methylphenyl)benzotriazole,
2-(2'-hydroxy-5'-tert-butylphenyl)benzotriazole,
2-(2'-hydroxy-3',5'-di-tert-butylphenyl)-benzotriazole,
2-(2'-hydroxy-3'-tert-butyl-5'-methylphenyl)-5-chlorobenzotriazole,
2-(2'-hydroxy-3',5'-di-tert-butylphenyl)-5-chlorobenzotriazole,
2-(2'-hydroxy-3',5'-di-tert-amylphenyl)-benzotriazole.

(Cyanoacrylate type)
2-ethylhexyl-2-cyano-3,3'-diphenylacrylate,
ethyl-2-cyano-3,3'-diphenylacrylate.

The U.V. absorvers are not restricted to those specifically described above. These U.V. absorver may be used singly or in combination of two or more species and can be used in combination with an antioxidant.

As described above, the liquid crystal device of the present invention is characterized by disposing a layer of a polymeric liquid crystal composition comprising at least one species of optically active polymer mesomorphic compound and at least one species of low-molecular weight mesomorphic compound between a pair of substrates, at least one of which preferably has a surface provided with an alignment control characteristic, whereby the liquid crystal layer shows a good alignment characteristic.

The polymeric liquid crystal composition can also be provided with an alignment characteristic when disposed as a uniaxially stretched film between the substrates.

If the above-mentioned polymeric liquid crystal composition shows a cholesteric (Ch)-smectic A (SmA) phase transition, a better alignment over a wide area can be obtained.

More specifically, for the aligning treatment, the polymeric liquid crystal composition is heated to a temperature above the cholesteric-smectic A phase transition temperature and then cooled passed the phase transition temperature, whereby a good alignment over a wide area can be achieved.

Such a polymeric liquid crystal composition showing a Ch-SmA phase transition temperature allows a larger cooling speed for alignment than a polymeric liquid crystal composition not showing a Ch-SmA phase transition temperature, thus providing a good alignment without an excessively long period of gradual cooling.

Further, it is preferred to constitute the polymeric liquid crystal composition of the present invention by mixing the optically active polymer mesomorphic compound with a low-molecular weight mesomorphic compound which per se is optically active. It is further preferred that the low-molecular weight mesomorphic compound provides a ferroelectric liquid crystal exhibiting an SmC* phase in order to allow for a high-speed responsive characteristic and a high contrast.

Moreover, it has been confirmed that a polymeric liquid crystal composition showing a larger helical pitch and a better effect accompanying the use of a polymer mesomorphic compound, thus exhibiting better film-formability and memory-stability, can be obtained by mixing the optically active polymer mesomorphic compound with a low-molecular weight mesomorphic compound exhibiting a helical rotation direction which is the reverse of that of the polymer mesomorphic compound. By using such a polymeric liquid crystal composition comprising components exhibiting mutually opposite helical rotations, a liquid crystal device with a good alignment can be obtained at a relatively large cell thickness.

The optically active polymer mesomorphic compound used for this purpose may be one of those represented by the formulas (16)–(40) described hereinbefore.

Table 1 below shows the experimentally observed helical rotation directions of the above-mentioned polymer mesomorphic compounds in their SmC* phases. Herein, with respect to a polymer mesomorphic compound showing no SmC* phase, the helical rotation direction of the polymer mesomorphic compound was judged to be the reverse of that of a low-molecular weight mesomorphic compound if it provided a composition the exhibiting the SmC* phase the exhibiting a larger helical pitch than that of the low-molecular weight mesomorphic compound alone when it was mixed with the low-molecular weight mesomorphic compound exhibiting SmC* phase.

TABLE 1

| Polymeric liquid crystal | | Direction of |
| --- | --- | --- |
| Formula | | helical rotation |
| 16 | | A.C. |
| 17 | (m = 10) | C. |
| 18 | (m = 9) | A.C. |
| 19 | (m = 6) | A.C. |
| 20 | | C. |
| 21 | (m = 15) | C. |
| 22 | (m = 9) | A.C. |
| 23 | (m = 9) | C. |
| 24 | (m = 7) | A.C. |
| 25 | (m = 7) | A.C. |
| 26 | | C. |
| 27 | | A.C. |
| 28 | | C. |
| 29 | (m = 5) | C. |
| 30 | (m = 5) | A.C. |
| 31 | | A.C. |
| 32 | (m = 4) | A.C. |
| 33 | | C. |
| 34 | | A.C. |
| 35 | (m = 2) | C. |
| 36 | (m = 1, l = 2 | C. |
| 37 | | Not Clear |
| 38 | | A.C. |
| 39 | (m = 1) | Not Clear |
| 40 | (m = 4) | A.C. |

A.C.: Counter-clockwise
C.: Clockwise

On the other hand, the low-molecular weight mesomorphic compound suitably be used for the above purpose may be a ferroelectric liquid crystal exhibiting a chiral smectic phase of any type of structure with either counter-clockwise helical rotation or clockwise helical rotation. Specific examples of such low-molecular mesomorphic compounds may include those represented by the following formulas (41)–(50). Counter-clockwise helical rotation

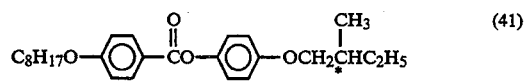
(41)

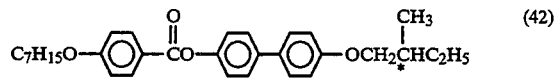
(42)

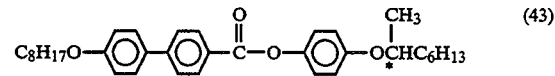
(43)

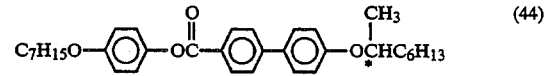
(44)

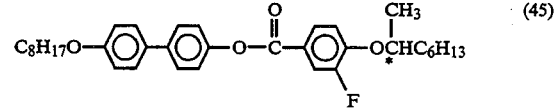
(45)

Clockwise helical rotation

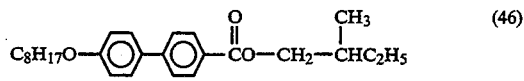
(46)

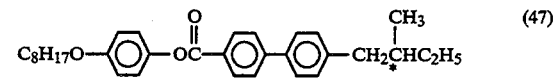
(47)

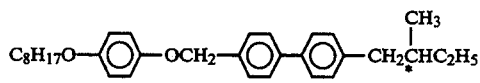 (48)

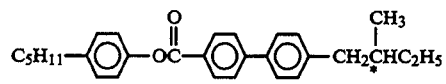 (49)

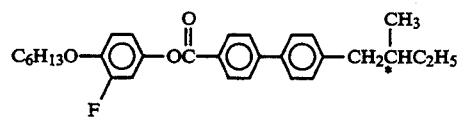 (50)

A liquid crystal device with an even better alignment characteristic may be provided by using a polymeric liquid crystal composition of the invention which comprises a polymer mesomorphic compound having an asymmetric carbon atom and a low-molecular weight mesomorphic compound and exhibits a Ch-SmA phase transition temperature, wherein the polymer mesomorphic compound and the low-molecular weight mesomorphic compound exhibit mutually reverse helical rotation directions.

As described above, the polymeric liquid crystal composition of the present invention comprises a polymer mesomorphic compound having an asymmetric carbon atom and a low-molecular weight mesomorphic compound. The composition has a good film-formability to provide a film of a large area exhibiting a stable alignment characteristic resistant to pressure or thermal impact and exhibiting a fast response speed substantially equal to that of the film of the low-molecular weight mesomorphic compound alone. The mechanism providing these properties has not been fully clarified as yet but may be attributable to a synergestic combination of the polymer and low-molecular weight mesomorphic compounds with substantially full exhibitions of these components.

The optically active polymer mesomorphic compound and the low-molecular weight mesomorphic compound show very high compatibility or mutual solubility therebetween, so that the polymer mesomorphic compound does not hinder the alignment characteristic of the low-molecular weight mesomorphic compound even if it does not provide a liquid crystal phase by itself. For the same reason, in case where the polymer mesomorphic compound provides a liquid crystal phase by itself, a good alignment characteristic is exhibited as a sum of the alignment characteristics of the low-molecular weight mesomorphic compound and the polymer mesomorphic compound.

Hereinbelow, the present invention will be explained more specifically based on Examples, wherein "parts" are by weight.

EXAMPLE 1

9.9 g of (+)-3-methyladipoyl chloride was dissolved in 100 ml of dry 1,2-dichloroethane, and a solution of 17.6 g of hydroquinone in 50 ml of dry pyridine was added thereto dropwise. After 48 hours of reaction after the addition, 1,2-dichloroethane was distilled off, and the product was washed with water and recrystallized from toluene to obtain 9 g (yield: 50%) of a compound represented by the following formula (I) (m.p.: 110° C.):

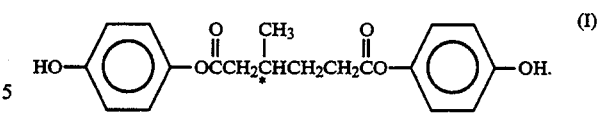 (I)

Then, 3.0 g of terephthalic chloride was dissolved in 200 ml of dry DMF, and a solution of 3.5 g of the above intermediate of the formula (I) dissolved in 30 ml of dry pyridine was added thereto dropwise, followed by 50 hours of reaction and 2 hours of reaction at 80° C. The product was re-precipitated from water-acetone to obtain a polymer mesomorphic compound represented by the following formula (II) and having an $\eta_{inh}$ (limiting viscosity, in trifluoroacetic acid at 30° C.) of 0.04 dl/g.

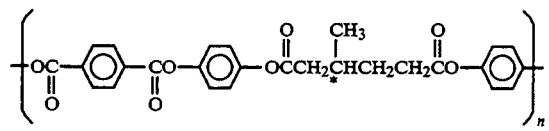

To 1 part of the above polymer mesomorphic compound, 4 parts of a low-molecular weight mesomorphic compound of the following formula (II) was added, and the mixture was uniformly dissolved under heating at 200° C. to obtain a polymeric liquid crystal composition.

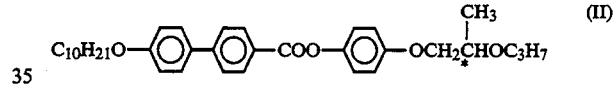 (II)

Separately, a blank cell was prepared by using a pair of glass substrates each having an ITO transparent electrode coated with about 500 Å-thick polyimide alignment film subjected to rubbing and applying the substrates to each other with a gap of 1.7 μm therebetween so that their rubbing directions were parallel with each other. Into the cell, the above polymeric liquid crystal composition heated into isotropic phase was injected under N2 stream and sealed up therein. The liquid crystal cell was gradually cooled at a rate of 1° C./min. from 220° C. and its SmC* phase at 100° C. was observed through cross nicol polarizers, whereby a uniformly aligned mono-domain was observed. The cell was supplied with an electric field of 1 V/μm to show a response time of 200 μsec which was not different from that of the low-molecular weight mesomorphic compound of the formula (II) .

Comparative Example 1

A polymer mesomorphic compound was prepared in the same manner as in Example 1 except that adipoyl chloride was used instead of the (+)-3-methyladipoyl chloride. A liquid crytal composition was prepared by mixing 1 part of the polymer mesomorphic compound and 4 parts of the low-molecular weight mesomorphic compound of the above formula (II) and used for preparation of a liquid crystal cell in the same manner as in Example 1.

According to the triangular wave application method, the cell showed a spontaneous polarization of 10 nC/cm² at 100° C. which was substantially lower than 20 nC/cm² of the low-molecular weight mesomorphic compound of the formula (II). The cell also showed a substantially longer response time of 1 msec at an electric field of 1 V/μm.

EXAMPLE 2

The liquid crystal cell with uniform alignment obtained in Example 1 was held at 100° C., and a hard rubber ball of 5 g in weight was dropped onto the liquid crystal cell from 20 cm thereabove to apply an impact, whereas the alignment was not destroyed.

Comparative Example 2

A blank cell was prepared in the same manner as in Example 1 and filled with the low-molecular weight mesomorphic compound of the formula (II) alone, followed by gradual cooling for alignment to prepare a liquid crystal cell. The liquid crystal cell was held at 100° C., and the 5 g-hard rubber ball was dropped thereto from 20 cm thereabove. As a result, the monodomain was converted into multi-domains called "sanded texture".

EXAMPLE 3

A 1 mm-thick glass plate coated with an ITO film was further coated with a polyamic acid solution ("PIQ", non-volatile content: 3 wt. %, available from Hitachi Kasei Kogyo K.K.) by spin coating, followed by heating for 30 min at 20° C., 60 min at 200° C., and 30 min at 350° C., to form a polyimide alignment film, which was then rubbed to be provided with a uniaxial alignment characteristic.

Separately, a polymeric liquid crystal composition was prepared by mixing 1 part of the polymer mesomorphic compound prepared in the Example and having the following formula:

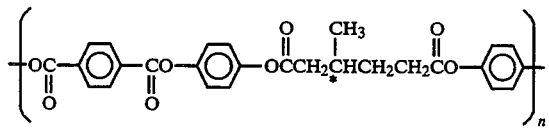

with a low-molecular weight ferroelectric mesomorphic compound of the formula (15) described hereinbefore under heating for uniform melting. The polymeric liquid crystal composition and 0.1 wt. % thereof of a light-absorbing colorant of the following formula (III)

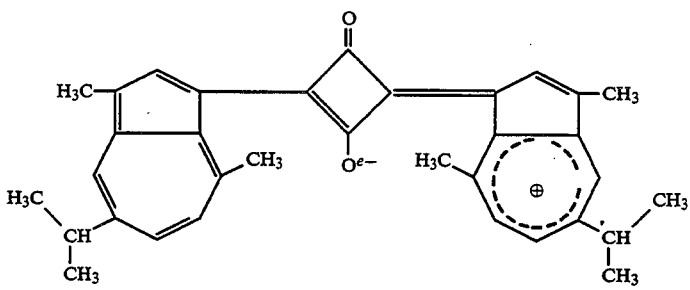

was dissolved in dichloroethane. The solution was applied by spin coating on the above prepared glass substrate having the polyimide alignment film through a mask, followed by drying at 100° C., to form an about 5 μm-thick liquid crystal layer 5 containing the colorant at the central part of the alignment film 4 on the substrate as shown in FIGS. 2C and 2D.

On the other hand, as shown in FIGS. 2E and 2F, an about 1 mm-thick Al substrate 1a was provided with a rubbed polyimide alignment film 4a in the same manner as above, and the peripheral part thereof was coated by printing with an epoxy adhesive layer 3 containing 4 μm-glass beads.

The two substrates prepared in the above manner were superposed with each other so that their rubbing directions conformed, and the two substrates were bonded to each other by passing them between hot pressure rollers at about 180° C.

Then, an excessive amount of the polymeric liquid crystal composition that gushed out of the opening was removed, and the opening was sealed with an epoxy adhesive, thereby to form a liquid crystal cell.

Then, the liquid crystal cell was heated to 185° C. to provide an isotropic phase and then gradually cooled to a temperature region of 100° to 110° C. providing the SmC* phase, where an electric field was applied to orient the spontaneous polarization of the liquid crystal layer in one direction. Thereafter, the cell was cooled to room temperature while the electric field was maintained, to thereby to fix the spontaneous polarization of the liquid crystal layer.

Figure 2A:
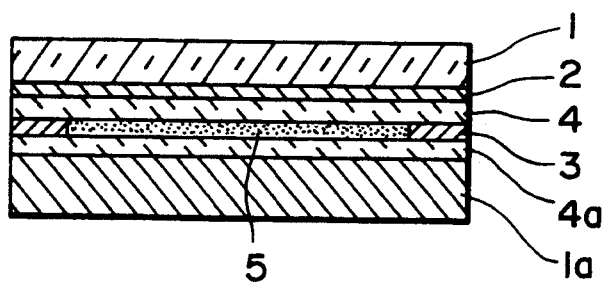
FIG. 2A is a sectional view of an optical card produced in Example 3 of the present invention described hereinafter.

The laminar structure of the liquid crystal cell thus prepared functioning as an optical card is shown in FIG. 2A wherein the same reference numerals refer to similar members as shown in FIG. 1 and electrode 2 is specifically shown additionally.

Figure 2B:
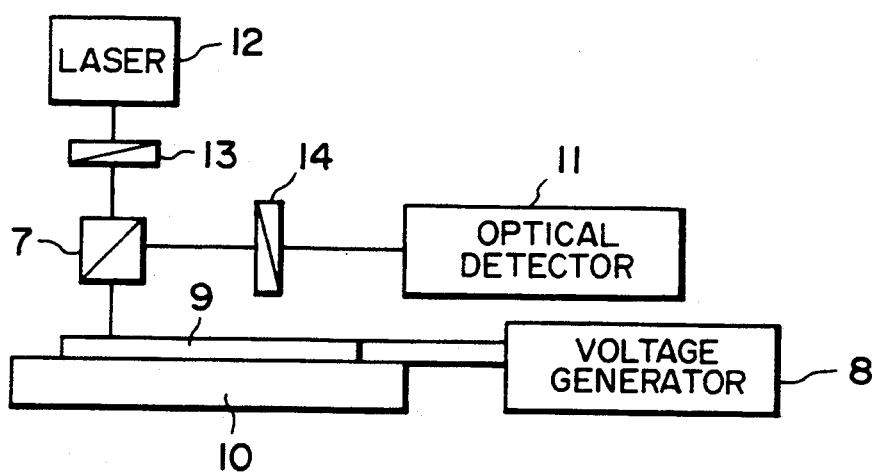
FIG. 2B is an illustration of an apparatus system for recording, reproduction and erasure on the optical card of the Example 3.

The thus prepared optical card can be subjected to recording, reproduction and erasure operations by means of an apparatus system shown in FIG. 2B which comprises a beam splitter 7, a voltage generator 8, an optical card 9 as prepared above, a moving stage 10, an optical intensity detector 11, a semiconductor laser 12, a polarizer 13 and an analyzer 14.

In a specific embodiment, the operation was effected in the following manner.

An electric field of 20–40 V (reverse electric field) in a direction opposite to the electric field for preparing the optical card was applied between the Al substrate 1a and ITO film 2, and the liquid crystal layer 5 kept under the electric field was irradiated with semiconductor laser light ($\lambda_{max}$: 830 nm, power: 1 mW) through the 1 mm-thick glass substrate 1 to be heated to a temperature range of 100° to 110° C. providing the SmC* phase, followed by gradual cooling, whereby the direction of spontaneous polarization of the light-irradiated portion of the liquid crystal layer was inverted to effect recording of information.

Then, the recorded information was reproduced by illuminating the liquid crystal layer with semiconductor laser light with a reduced power of 0.3 mW Next a difference in reflected light intensity due to a difference in birefringence between the recorded portion was detected and the non-recorded portion by an optical intensity detector 11 through a polarizer 13 and an analyzer 14. As a result, a reproduction contrast ratio (=(A−B)/A, A and B: reflected light intensities from the recorded and non-recorded portions, respectively) of 0.54 was obtained.

Further, the partial or whole area erasure of the liquid crystal layer could be effected by heating a part or the whole area of the liquid crystal layer by irradiation with semiconductor laser light or another external heating means, followed by gradual cooling, under the application of a normal direction of an electric field between the Al and ITO film.

Further, the recording on the optical card could also be effected by irradiating the liquid crystal layer with semiconductor laser light ($\lambda_{max}$: 830 nm, power: 2 mW) with no application of an electric field to heat the liquid crystal layer to an isotropic phase, followed by rapid cooling, to thereby to cause the irradiated portion of the liquid crystal layer to lose spontaneous polarization selectively. The record thus obtained was reproduced and erased in the same manner as in the above method, whereby a reproduction contrast ratio of 0.53 was obtained.

The cycle of recording, reproduction and erasure was repeated for 50 times for each of the above two methods, whereby no change in contrast ratio was observed.

The optical response time for recording and partial erasure was 3.5 msec by the former method and 5.0 msec by the latter method.

EXAMPLE 4

Two 1 mm-thick glass substrates each provided with ITO film stripes were further coated with a polyimide alignment film similarly as in Example 3. One of the alignment films was rubbed in the direction of extension of the ITO stripes to provide a substrate A, and the other was rubbed in a direction perpendicular to the extension of the ITO stripes to provide a substrate B.

Then, a dichloroethane solution of a polymeric liquid crystal composition identical to that of Example 3 but not containing the light-absorbing colorant was applied by spin coating on the polyimide alignment film of the substrate A through a mask as explained with reference to FIGS. 2C and 2D, followed by drying at 100° C., to form a 5 μm-thick liquid crystal layer on the central part of the substrate.

On the other hand, an epoxy adhesive containing 4 μm glass beads was applied by printing on the peripheral part of the polyimide alignment film of the substrate B as shown in FIGS. 2E and 2F.

Figure 3A:
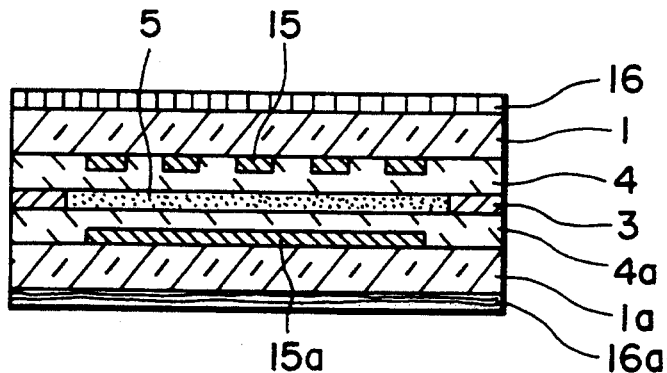
FIG. 3A is a sectional view of a display device in Example 4 of the invention.
Figure 3B:
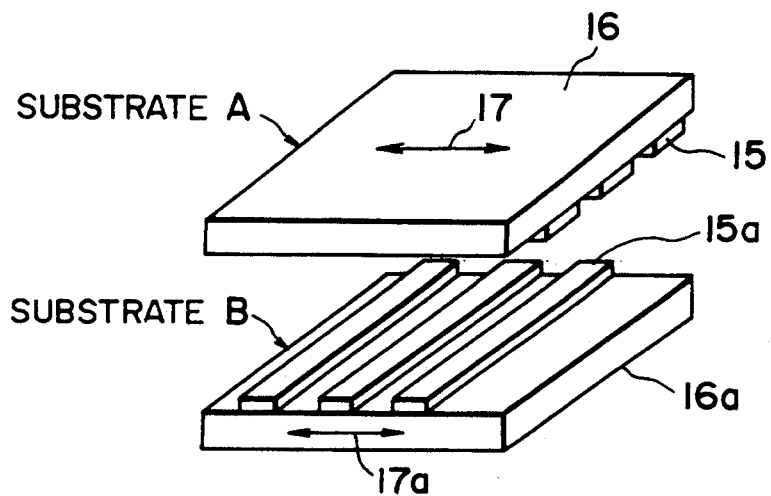
FIG. 3B is a perspective exploded view of two glass substrates on which transparent stripe electrodes and alignment films were formed for illustrating a relationship between the directions of the stripe electrode extensions and the directions of rubbing the alignment films in Example 4 of the invention.

Then, the above two substrates were superposed with each other so that their rubbing directions 17 and 17a were parallel each other and their ITO stripes 15 and 15a crossed each other at right angles as shown in FIG. 3B, and the two substrate were bonded to each other by being passed between hot pressure rollers at about 180° C.

An excessive amount of the polymeric liquid crystal composition that gushed out of the opening was removed, and the opening was sealed with an epoxy adhesive, to thereby to form a liquid crystal cell.

Then, the liquid crystal cell was heated to 185° C. to provide an isotropic phase and then gradually cooled to a temperature region of SmC* phase, whereby the liquid crystal layer was uniformly aligned.

In this state, appropriate signals were applied between the ITO films 15 and 15a to cause an inversion of the spontaneous polarization of the liquid crystal layer. Then, a pair of polarizer films 16 and 16a were disposed above and below the cell so that the inversion of the spontaneous polarization provided a maximum difference in transmitted light intensity, whereby a display device having a structural arrangement as shown in FIGS. 3A and 3B was prepared.

Figure 4:
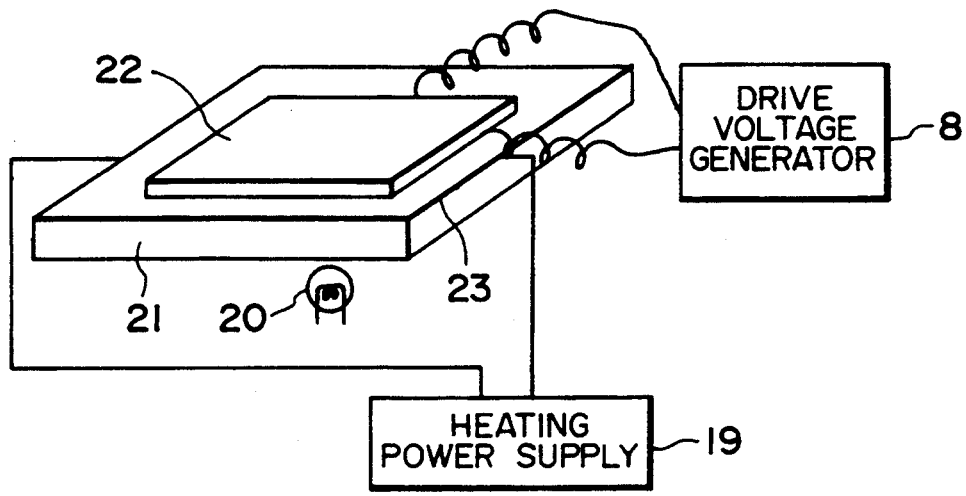
FIG. 4 is an illustration of a display apparatus in Example 4 of the invention.

Referring to FIG. 4, a display device 20 obtained in the above described manner driven by a driver voltage source 8 was disposed on a transparent stage 21 having a layer of transparent resistive heating element 23, and a back light source 20 was disposed below the stage 21. The resistive heating layer 23 was energized by a power supply 19 to heat the liquid crystal layer into the SmC* phase and the display device 22 was driven by the driver 8 to provide a display.

The display thus obtained gave a display contrast (=|A−B|/A; A and B: transmitted light intensities at display and non-display portions, respectively).

Further, the response time for inversion between the display and non-display states was 180 μsec under application of ±16 volts at 100° C.

EXAMPLE 5

1 part of the polymer mesomorphic compound obtained in Example 1 was mixed with 2 parts of a low-molecular weight mesomorphic compound of the formula (IV) below and 3 parts of a low-molecular weight mesomorphic compound of the formula (V) below, followed by heating at 200° C. for uniform melting to obtain a polymeric liquid crystal composition:

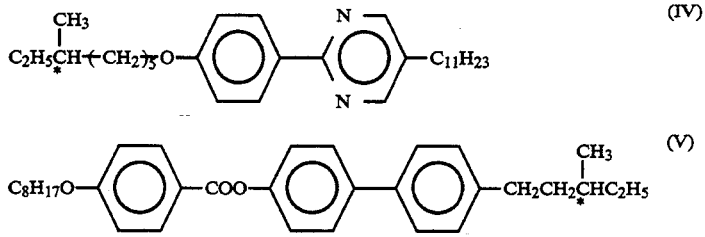

Separately, a blank cell was prepared by using a pair of glass substrates each having an ITO transparent electrode coated with about 500 Å-thick polyimide alignment film subjected to rubbing and applying the substrates to each other with a gap of 1.7 μm therebetween. Into the cell, the above polymeric liquid crystal composition heated into isotropic phase was injected under $N_2$ stream and sealed up therein. The liquid crystal cell was gradually cooled from 220° C. and its SmC* phase at 80° C. was observed through cross nicol polarizers, whereby a uniformly aligned monodomain was observed. The cell was supplied with an electric field of 1 V/μm to show a response time of 800 μsec.

The cell was subjected to the same impact test with a hard rubber ball as in Example 2, whereby substantially no disorder in alignment was observed to show a good impact resistance.

EXAMPLE 6

8.0 g (0.05 mol) of (S)-2-tetrahydropyranyl-oxy-1-hydroxypropane was added to THF containing 1.50 g of NaOH dispersed therein, followed by 2 hours of stirring at room temperature and 2 hours of heat refluxing. Into the solution, a solution of 5.8 g of benzyl chloride in THF was added, and the mixture was subjected to 2 hours of heat refluxing, cooled, charged into water and then subjected to extraction with ether.

The ether was distilled off and the product was subjected to distillation under vacuum to obtain 8 g of a compound of the following formula (VI):

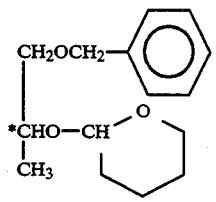

(VI)

7 g of the compound of the formula (VI) and 1 g of Amberlyst-15H (an ion-exchange resin available from Aldrich Co.) were dispersed in methanol, followed by 3 hours of stirring, distilling-off of methanol and distillation to obtain 4 g of a compound of the following formula (VII):

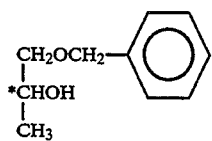

(VII)

3 g of the compound of the formula (VII) was dissolved in 30 ml of DMF, and the solution was further added to a dispersion of 0.43 g of NaH in DMF, followed by 5 hours of stirring at room temperature. The mixture was further heated to 60° C. for 2 hours of stirring, and a DMF solution of 6 g of (S)-1-tosyloxy-2-tetrahydropyranyloxypropane was added thereto, followed by stirring for 3 hours at room temperature and 1 hour at 80° C., removal of the protection group with Amberlyst-15H and distillation to obtain 2 g of a compound of the following formula (VIII) (b.p.: 150° C./0.1 mmHg):

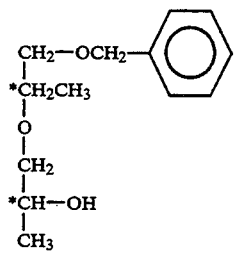

(VIII)

The compound of the formula (VIII) was dissolved in ethanol and subjected to hydrogenation in the presence of Pd (10%)/C as a catalyst to obtain 1 g of a diol of the following formula (IX) (b.p.: 100° C./1 mmHz):

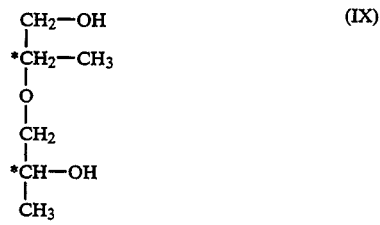

(IX)

Separately, 60 g of 4-hydroxybenzoic acid was dissolved in 500 ml of ethanol, and a solution of 15 g of NaOH in 500 ml of water was added thereto. To the mixture was added 50 g of benzyl chloride, followed by stirring for 2 hours at room temperature and 2 hours of heat refluxing. After distilling off the solvent, the product was recrystallized from ethanol to obtain 40 g of benzyl-4-hydroxybenzoic acid. Then, 17 g of the benzyl-4-hydroxybenzoic acid was dissolved in 100 ml of pyridine, and 8 g of terephthaloyl chloride was added thereto, followed by stirring for 2 hours at room temperature and for 1 hour at 70° C. The reaction mixture was added to 500 ml of 2M-HCl to obtain 10 g of bis(4-benzyloxycarbonylphenyl)terephthalate, which was then added to 150 ml of trifluoroacetic acid, followed by addition of 10 ml of 33% HBr solution in acetic acid and reaction for 12 hours at room temperature. Acetone was added to the reaction mixture to result in a precipitate, which was then separated and washed with acetone to obtain 4 g of bis (4-carboxyphenyl)terephthalate. Then, 2 g of the diacid was mixed with 40 ml of SOCl$_2$, followed by 2 hours of heat refluxing, reduced pressure distillation for removal of an excess of SOCl$_2$, addition of 1,2-dichloroethane and addition of a solution of 1 g of the compound of the formula (IX) in 5 ml of pyridine. The mixture was subjected to reaction at 60° C. for 3 hours and at room temperature for 10 hours. The reaction product was re-precipitated from acetone and washed with water to obtain a polymer mesomorphic compound of the following formula (X) ($\eta_{inh}$=0.02 dl/g):

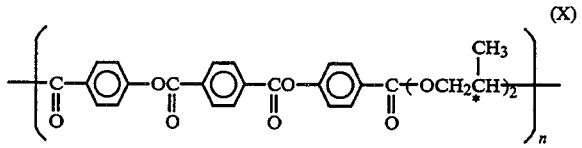

(X)

1 part of the polymer mesomorphic compound was mixed with 3 parts of a low-molecular weight mesomorphic compound of the following formula (II) to obtain a polymeric liquid crystal composition:

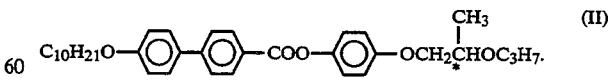

(II)

The above polymeric liquid crystal composition was sealed in a blank cell prepared in the same manner as in Example 1 to prepare a liquid crystal cell. The liquid crystal cell was gradually cooled from 220° C. and its SmC* phase at 100° C. was observed through cross nicol polarizers, whereby a uniformly aligned monodomain was observed. The cell was supplied with an electric field of 1 V/μm to show a response time of 200 μsec which was not different from that of the low-molecular weight mesomorphic compound of the formula (II).

EXAMPLE 7

Example 6 was repeated by replacing the low-molecular weight mesomorphic compound respectively with those shown in the following Table 2 in the indicated amount.

The measured values of the response time are also shown in the Table 2 below.

TABLE 2

| Low-molecular weight mesomorphic compound | Amount | Response time (μsec) |
| --- | --- | --- |
| Compound of the formula (2) described hereinbefore | 3 parts | 220 |
| Compound of the formula (6) | 3 parts | 210 |
| Compound of the formula (11) | 3 parts | 230 |
| Compound of the formula (4) + Compound of the formula (5) | 1 part + 2 parts | 210 |

EXAMPLE 8

1 part of the polymer mesomorphic compound obtained in Example 1 was mixed with 2 parts of a low-molecular weight mesomorphic compound of the following formula (XI), followed by heating at 200° C. for uniform dissolution, to obtain a polymeric liquid crystal composition showing a Ch-SmA transition temperature of 140° C.

Separately, a blank cell was prepared by using a pair of glass substrates each measuring 210 mm×300 mm and provided with an ITO electrode coated with about 500 Å-thick polyimide alignment film subjected to rubbing and applying the substrates to each other with a gap of 1.7 μm. Into the cell, the above polymeric liquid crystal composition heated into isotropic phase was injected under $N_2$ stream and seal up therein. The liquid crystal cell was cooled from 220° C. at a rate of 0.5° C./min, and its SmC* phase was observed at 100° C. through cross nicol polarizers, whereby a uniformly aligned monodomain was observed. The liquid crystal cell was supplied with an electric field of 1 V/μm to show a response time of 800 μsec.

EXAMPLE 9

A polymer mesomorphic compound of the formula (31) with m=5 having a counter-clockwise helical rotation was mixed with a low-molecular weight mesomorphic compound of the formula (50) having a clockwise helical rotation at various proportions, whereby a polymeric liquid crystal composition exhibiting the SmC* phase was obtained at a content of 50 wt. % or more of the low-molecular weight mesomorphic compound. The response time in response to an electric field of the composition was examined, whereby the composition showed substantially the same response time as the low-molecular weight mesomorphic compound at a content of 70 wt. % or more of the low-molecular weight mesomorphic compound.

The composition containing 50 wt. % of the low-molecular weight mesomorphic compound exhibited a helical pitch of 30 μm or more. The liquid crystal composition in the isotropic phase was injected into a blank cell comprising a pair of substrates provided with ITO electrodes and parallel orientation treatments and having a relatively large cell gap of 100 μm to form a liquid crystal cell, which was then gradually cooled to the SmC* phase and observed through a polarizing microscope. As a result, a better monodomain formation was observed compared with a case where the low-molecular weight mesomorphic compound alone was used.

EXAMPLES 10–23

Each of the polymer mesomorphic compounds shown in the following Table 3 and having a counter-clockwise helical rotation was mixed in a proportion of 20 wt. % with the low-molecular weight mesomorphic compound of the formula (50). All the resultant compositions were confirmed to exhibiting the SmC* phase. The spontaneous polarizations Ps ($nC/cm^2$) of the compositions were measured and are also shown in the following Table 3.

TABLE 3

| Example | Polymer mesomorphic compound | Ps of polymeric liquid crystal composition ($nC/cm^2$) |
| --- | --- | --- |
| 10 | (16) | 3.8 |
| 11 | (18), m = 9 | 3.9 |
| 12 | (19), m = 6 | 4.2 |
| 13 | (22), m = 9 | 4.4 |
| 14 | (24), m = 7 | 3.5 |
| 15 | (25), m = 7 | 4.8 |
| 16 | (27) | 4.3 |
| 17 | (30), m = 5 | 3.9 |
| 18 | (31) | 4.2 |
| 19 | (32), m = 4 | 3.4 |
| 20 | (34) | 3.8 |
| 21 | (38) | 4.6 |
| 22 | (39), m = 1 | 3.7 |
| 23 | (40), m = 4 | 3.5 |

*Each composition comprised 20 wt. % of a polymer mesomorphic compound and 80 wt. % of the low-molecular weight mesomorphic compound of the formula (50).

Each of the above compositions was sealed in the same cell having a cell gap of 100 μm as used in Example 9, and was gradually cooled from the isotropic phase to the SmC* phase, where the alignment state was observed. As a result, each composition also showed a better monodomain formation characteristic, and the direction of the normal to the smectic molecular layers coincided with the rubbing direction. This means that the helical rotation of the low-molecular weight mesomorphic compound (50) was compensated for by the addition of a polymer mesomorphic compound having a counter-clockwise helical rotation. Further, the spontaneous polarization Ps of each composition was not remarkably low compared with that of the low-molecular weight mesomorphic compound (50) alone. The helical rotation direction of the polymer mesomorphic compound (39) alone could not be determined, but the addition effect thereof as described above was observed when added to the low-molecular weight mesomorphic compound (50).

EXAMPLE 24

Figure 5:
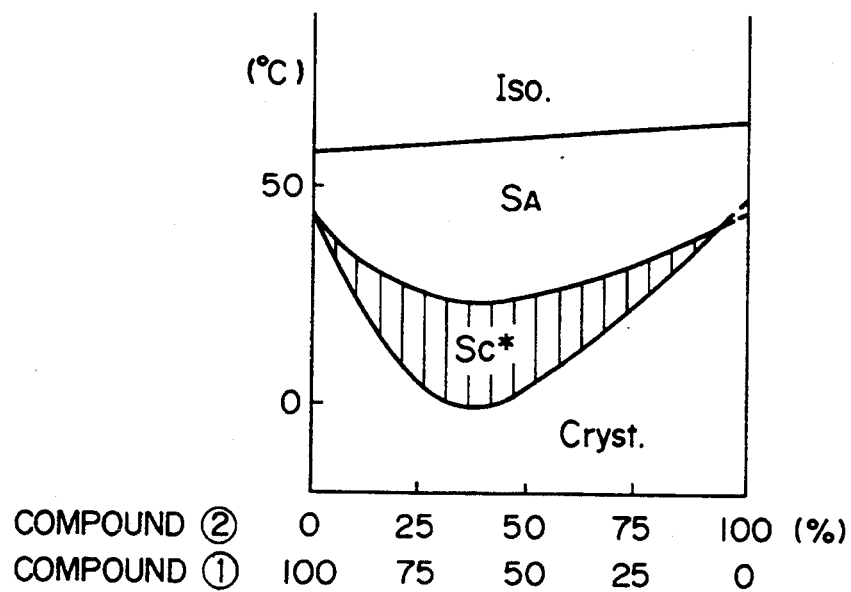
FIG. 5 is a phase diagram of a two component mixture system comprising Compound ① and Compound ②.

A phase diagram of a two-component mixture system comprising low-molecular weight mesomorphic compounds of the formulas ① and ② shown below (hereinafter called "compound ①" and "compound ②") having a counter-clockwise helical rotation and a clockwise helical rotation, respectively, is shown in FIG. 5.

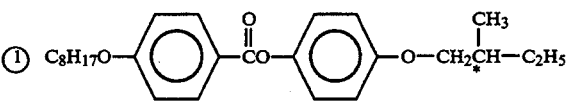

-continued

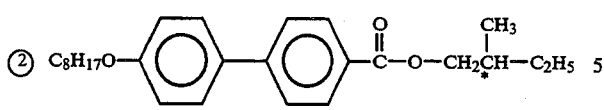

1 part of the polymer mesomorphic compound obtained in Example 1 was mixed with 4 parts of the above-mentioned two-component mixture comprising various proportions of the components ①and ② for a mutual solubility test. As a result, a phase diagram substantially identical to one shown in FIG. 5 was obtained.

Figure 6:
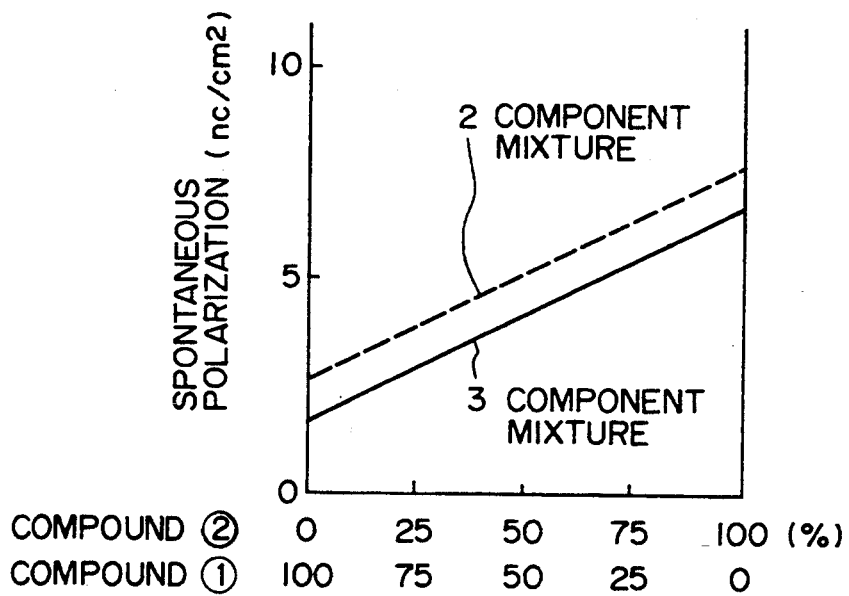
FIG. 6 is a graph showing the magnitudes of spontaneous polarization.

More specifically, the three component mixture system comprising the polymer mesomorphic compound and the compounds ① and ② (1 wt. part of the polymer mesomorphic compound and 4 wt. parts of the two-component mixture system of the compounds ① and ②), caused phase transition at similar temperature as the two-component mixture system of the compounds ① and ②. The three-component mixture system and the two-component mixture system consisting only of low-molecular weight mesomorphic compounds showed spontaneous polarizations Ps as shown in FIG. 6. As is shown in FIG. 6, the magnitude of the spontaneous polarization was not remarkably changed by the addition of the polymer mesomorphic compound.

EXAMPLE 25

A three-component mixture liquid crystal composition was prepared by mixing 1 part of the polymer mesomorphic compound used in Example 24, 3 parts of the compound ①, and ① part of compound ②. The liquid crystal composition showed a helical pitch of 12 μm.

Separately, a blank cell was prepared by using a pair of substrates each measuring 210 mm×300 mm and provided with ITO electrodes coated with a rubbed polyimide alignment film and disposing them with a gap of 5 μm. Into the cell, the above liquid crystal composition was injected and gradually cooled from isotropic phase to SmC phase, whereby a good monodomain was formed.

The liquid crystal cell was supplied with an AC electric field of 5.03 Hz and 15 volts to show a response time of 2.3 msec at 20° C. which was not substantially different from that obtained by using the mixture of only the low-molecular weight mesomorphic compounds.

EXAMPLE 26

The polymer mesomorphic compound used in Example 24 was mixed with the two-component low-molecular weight ferroelectric liquid crystal mixture used in Example 25 in various proportions ranging from about 40 wt. %–80 wt. % of the former to provide several polymeric liquid crystal compositions.

Each composition was melted and formed into a film, which was then sandwiched between two PET films and passed between two rollers rotating at different circumferential speeds to be uniaxially stretched, followed by cooling from SmA phase. Each of the resultant films was confirmed to a satisfactorily aligned film as a result of observation through a polarizing microscope.

EXAMPLE 27

An antioxidant Irganox 1076 (available from Ciba-Geigy Corp.) of the following formula:

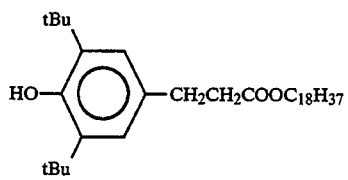

was added in a proportion of 0.001 wt. % to the polymeric liquid crystal composition of Example 3 to form a liquid crystal composition, which was then used to prepare a liquid crystal cell in the same manner as in Example 3.

The liquid crystal cell functioning as an optical card was subjected to recording, reproduction and erasure in the same manner as in Example 3, whereby a reproduction contrast ratio of 0.53 and an optical response time for recording of 3.5 msec were attained. Then, the liquid crystal cell was subjected to 500 cycles of recording, reproduction and erasure for a durability test, after which the liquid crystal cell had a reproduction contrast ratio of 0.49 and an optical response time for recording of 3.8 msec which were better than the 0.33 and 5.2 msec obtained by using the liquid crystal cell of Example 3 after the durability test.

EXAMPLE 28

An ultraviolet absorver Uvinul-N-539 (2-ethylhexyl-2-cyano-3,3'-diphenylacrylate; available from BASF A.G.) was added in a proportion of 0.001 wt. % to the polymeric liquid crystal composition of Example 3 to form a liquid crystal composition, which was used to prepare a liquid crystal cell in the same manner as in Example 3.

The liquid crystal cell functioning as an optical card was subjected to recording, reproduction and erasure in the same manner as in Example 3, whereby a reproduction contrast ratio of 0.52 and an optical response time for recording of 3.5 msec were attained. Then, the liquid crystal cell was subjected to 500 hours of light exposure by a xenon arc lamp-type light fastness tester (available from Toyo Rika K.K.; 1.5 KW), after which the liquid crystal cell had a reproduction contrast ratio of 0.51 and an optical response time of 3.7 msec which were better than the 0.27 and 5.0 msec obtained by using the liquid crystal cell of Example 3 after the 500 hours of light exposure.

As described hereinabove, the polymeric liquid crystal composition according to the present invention comprising a polymer mesomorphic compound having an asymmetric carbon atom and a low-molecular weight mesomorphic compound has various advantageous features such that (1) it is easily formed into a film to provide a film of a large area, (2) it exhibiting a response speed which is not substantially different from that of the low-molecular weight mesomorphic compound, and (3) it stably retains alignment resistant to pressure or heat impact. Accordingly, there is provided a display device of a large area and a high degree of fineness and yet capable of a high speed display.

Further, the present invention provides a liquid crystal device which comprises a polymeric liquid crystal composition comprising an optically active polymer mesomorphic compound and at least one species of low-molecular weight mesomorphic compounds sandwiched between a pair of substrates provided with an orientation or aligning characteristic. Because the liquid crystal composition comprises a polymer mesomorphic compound, it is readily formed into a liquid crystal layer on a substrate.

Further, by using an optically active polymer mesomorphic compound which is excellent in mutual solubility with a low-molecular weight mesomorphic compound, a good uniform alignment can be obtained by using a substrate provided with an orientation characteristic which has been generally used for a low-molecular weight liquid crystal showing a low melt viscosity. As a result, it provides a good contrast ratio and a high response speed when used in an optical recording medium and a display device.

What is claimed is:

1. A liquid crystal device, comprising:
   a chiral smectic liquid crystal layer of a polymeric liquid crystal composition, and
   a pair of electrode plates sandwiching the liquid crystal layer for applying a voltage across the liquid crystal layer so as to select an orientation state of the liquid crystal molecules in chiral smectic phase based on the polarity of the voltage;
   said polymeric liquid crystal composition comprising:
   an optically active polymer mesomorphic compound selected from the group consisting of: (a) side chain-type polymer mesomorphic compounds having 10 or more recurring units and having a mesogen unit in their side chains, and (b) main chain-type polymer mesomorphic compounds having 5 or more recurring units and having a mesogen unit in their main chain; and
   a non-polymeric mesomorphic compound having a chiral smectic phase.

2. A device according to claim 1, wherein at least one of the electrode plates has an alignment face for aligning the molecular axis of the polymeric liquid crystal composition in contact with the alignment face in one direction.

3. A device according to claim 2, wherein the alignment face has been formed by rubbing the substrate face.

4. A device according to claim 2, wherein the alignment face is formed by a film of an organic or inorganic insulating material.

5. A device according to claim 2, wherein the alignment face has been formed by oblique vapor deposition of an inorganic insulating material on the substrate face.

6. A device according to claim 5, wherein said insulating material is SiO or $SiO_2$.

7. A device according to claim 2, wherein said alignment face has been obtained by subjecting the substrate face to oblique etching.

8. A device according to claim 7, wherein said alignment face is provided by a film of an organic or inorganic insulating material or the aligned substrate per se.

9. A device according to claim 1, which contains 10–90 wt. % of the polymer mesomorphic compound.

10. A device according to claim 1, wherein said polymeric liquid crystal composition shows a cholesteric phase and a smectic A phase.

11. A device according to claim 1, wherein said polymer mesomorphic compound and non-polymeric mesomorphic compound have mutually reverse helical rotation directions.

12. A device according to claim 1, wherein said polymeric liquid crystal composition contains a light-absorbing colorant.

13. A device according to claim 1, wherein said polymeric liquid crystal composition contains an anti-oxidant.

14. A device according to claim 1, wherein said polymeric liquid crystal composition contains an ultraviolet absorber.

15. A liquid crystal device according to claim 1, which further comprises switching means for applying an electric field pulse having a duration longer than the optical response time of the polymeric liquid crystal composition.

* * * * *

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga, et al.

Page 1 of 7

It is certified that error appears in the above-indentified patent and that said Letters Patent is hereby corrected as shown below:

On the Title page, Item

[56] References Cited

FOREIGN PATENT DOCUMENTS, "6090290" should read --60-90290--.

COLUMN 1

Line 5, "is" (first occurrence) should be deleted;

Line 20, "devices" should read --device--; and

Line 33, "device," should read --device--.

COLUMN 2

Line 28, "N. Pláate," should read --N. Pláte,--; and

Line 40, "surface for example" should read --surface, for example,--.

COLUMN 4

Line 30, "un-identi-" should read --unidenti--.

COLUMN 6

Line 3, "(8)" should be deleted;

Line 6, --(8)-- should be inserted;

Line 16, "(9)" should be deleted;

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga, et al It is certified that error appears in the above-indentified patent and that said Letters Patent is hereby corrected as shown below:

COLUMN 6, Cont'd.

Line 19, --(9)-- should be inserted;

Line 27, "(10)" should be deleted;

Line 33, --(10)-- should be inserted;

Line 42, "(11)" should be deleted;

Line 44, --(11)-- should be inserted; and

Line 52, "(12)" should be deleted.

COLUMN 7

Line 1, --(12)-- should be inserted;

Line 9, "(13)" should be deleted;

Line 12, --(13)-- should be inserted;

Line 20, "(14)" should be deleted; and

Line 27, --(14)-- should be inserted.

COLUMN 9

Formula (18), "($m_2 = 2-10$)" should read --($m_1 = 2-10$)--; and

Between Formulas "(19)" and "(21)" insert --(20)--.

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga, et al It is certified that error appears in the above-indentified patent and that said Letters Patent is hereby corrected as shown below:

COLUMN 11

Formula (27), "
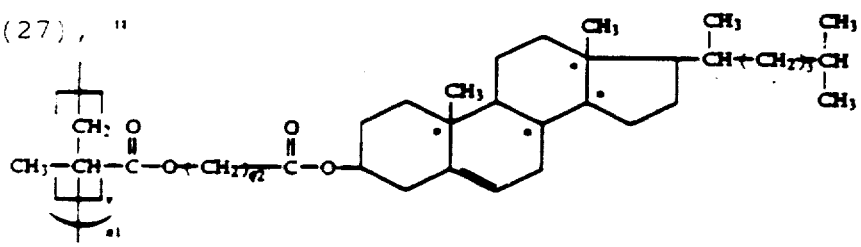

should read --
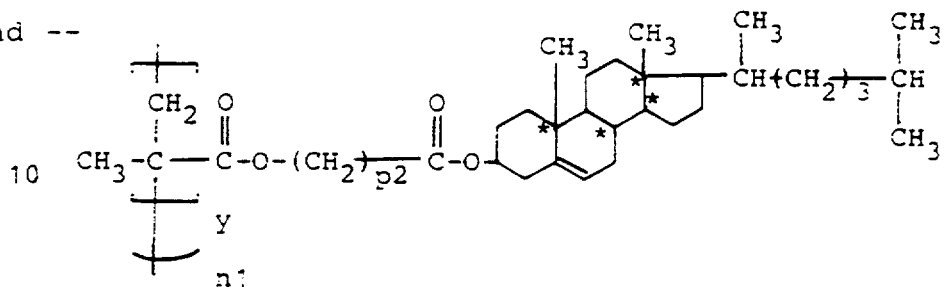
--;

Line 54, "etherdicarboxylic" should read --ether-dicarboxylic--.

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga et al It is certified that error appears in the above-indentified patent and that said Letters Patent is hereby corrected as shown below:

COLUMN 15

Formula (34), 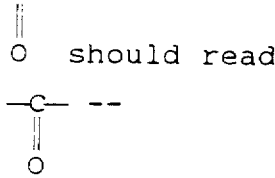 should read $$--B = -\underset{\underset{O}{\|}}{C}- --$$

COLUMN 17

Line 26, "an ununiform" should read --a nonuniform--.

COLUMN 18

Line 26, "vapor" should read --Vapor--; and

Line 61, "scaled" should read --sealed--.

COLUMN 19

Line 43, insert --(Monophenol type)--; and

Line 49, "\tBu" should read --\tBu: tertiary butyl group--.

COLUMN 22

Line 65, "absorvers" should read --absorbers--; and
Line 66, "absorver" should read --absorber.

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga et al.

It is certified that error appears in the above-indentified patent and that said Letters Patent is hereby corrected as shown below:

COLUMN 23

Line 22, "passed" should read --past--; and

Line 66, "the" (first and third occurrences) should be deleted.

COLUMN 24

Line 2, "exhibiting" should read --exhibiting the--;

Line 23, "1=2" should read --1=2)--;

Line 31, "be" should be deleted; and

Line 37, "Counter-clockwise" should read
--¶ Counterclockwise--.

COLUMN 28

Line 66, "0.3mW" should read --0.3mW.--.

COLUMN 29

Line 19, "to" (second occurrence) should be deleted;

Line 66, "parallel" should read --parallel to--; and

Line 68, "substrate" should read --substrates--.

COLUMN 30

Line 6, "to" (second occurrence) should be deleted.

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga et al.

It is certified that error appears in the above-indentified patent and that said Letters Patent is hereby corrected as shown below:

COLUMN 33

Line 36, "Into the cell," should read --The--;

Line 37, "heated" should read --was heated--; and "was" should read --and was--; and Line 38, "injected" should read --injected into the cell" and "seal" should read --sealed--.

COLUMN 34

Line 12, "exhibiting" should read --exhibit--.

COLUMN 35

Line 15, "three component" should read --three-component--;

Line 36, " $\overline{1}$ part" should read -- $\overline{1}$ part--; and

Line 66, "to" should read --to be--.

UNITED STATES PATENT AND TRADEMARK OFFICE
CERTIFICATE OF CORRECTION

PATENT NO. : 5,384,069
DATED : January 24, 1995
INVENTOR(S) : Kazuo Yoshinaga et al.

It is certified that error appears in the above-indentified patent and that said Letters Patent is hereby corrected as shown below:

COLUMN 36

Line 33, "absorver" should read --absorber--; and

Line 59, "exhibiting" should read --exhibits--.

Signed and Sealed this

Thirty-first Day of October 1995

Attest:

BRUCE LEHMAN

*Attesting Officer*      *Commissioner of Patents and Trademarks*